(12) United States Patent
van Zee et al.

(10) Patent No.: US 6,972,861 B1
(45) Date of Patent: Dec. 6, 2005

(54) AUTOMATED CONTENT HANDLING SYSTEM AND RELATED METHODS

(75) Inventors: Pieter J. van Zee, Corvallis, OR (US); Ronald W. Voll, Corvallis, OR (US)

(73) Assignee: Hewlett-Packard Development Company L.P., Houston, TX (US)

( * ) Notice: Subject to any disclaimer, the term of this patent is extended or adjusted under 35 U.S.C. 154(b) by 1037 days.

(21) Appl. No.: 09/611,682

(22) Filed: Jul. 7, 2000

Related U.S. Application Data

(63) Continuation-in-part of application No. 09/325,040, filed on Jun. 7, 1999.

(51) Int. Cl.[7] ............................................. G06F 15/00
(52) U.S. Cl. .................................... 358/1.15; 358/1.14
(58) Field of Search ................................ 358/1.15, 1.1, 358/1.9, 1.13, 1.16, 1.12, 1.6, 1.4, 3.32

(56) References Cited

U.S. PATENT DOCUMENTS

| | | | |
|---|---|---|---|
| 5,715,416 A | 2/1998 | Baker | .......................... 395/349 |
| 5,727,950 A | 3/1998 | Cook et al. | .................. 434/350 |
| 5,793,368 A | 8/1998 | Beer | ............................ 345/334 |
| 5,907,837 A | 5/1999 | Ferrel et al. | .................... 707/3 |
| 6,138,151 A * | 10/2000 | Reber et al. | ................. 709/219 |
| 6,206,750 B1 * | 3/2001 | Barad et al. | ................. 446/268 |
| 6,385,728 B1 * | 5/2002 | DeBry | ......................... 713/201 |
| 6,658,464 B2 * | 12/2003 | Reisman | ...................... 709/219 |
| 6,697,838 B1 * | 2/2004 | Jakobson | ..................... 709/203 |
| 2001/0014184 A1 * | 8/2001 | Bubie et al. | ................. 382/293 |

* cited by examiner

Primary Examiner—Mark Wallerson
(74) Attorney, Agent, or Firm—Hewlett-Packard Company

(57) ABSTRACT

A method comprising issuing a plurality of instructions to a requesting computer to render content, the plurality of instructions including at least a subset which are interpreted to render an iconic selector associated with a service, wherein user selection of the iconic selector generates a request to download, subscribe to, index and/or print content from the service, and fulfilling the request(s) without requiring further input from the user.

10 Claims, 20 Drawing Sheets

FRIDAY May 7, 1999

TIME.com afternoon update

Current Indexes
Fri May 7 16:45 EDT

All Riding on Moscow

The spin in Washington: Moscow has "finally" agreed to Western demands for a peacekeeping force in Kosovo, leaving Milosevic isolated. The spin in Moscow: Russia has always accepted a peacekeeping force in Kosovo, and Washington has finally signed on to a peace plan the Kremlin has been pushing for weeks. The spin in Belgrade: Milosevic is ready to talk about a U.N. presence in Kosovo, but not before NATO halts its bombing – a position backed by Moscow. NATO remains committed to bombing until its demands are met, and pounded targets in Yugoslav cities overnight.

↖ 11000

Peace now depends on finding a formula by which the Serbs can make sufficient concessions to persuade NATO to ground its bombers. "NATO's not going to easily suspend the bombing because it knows it may be politically unable to restart it," says TIME Pentagon correspondent Mark Thompson. "The alliance may even intensify the bombing in the hope of making Milosevic more compliant." It will be left to Moscow, once again, to choreograph a sequence of symmetrical Serb withdrawal and NATO bombing suspension. Russian envoy Viktor Chernomyrdin heads for Washington Sunday and plans to visit Belgrade shortly. The tracks toward a peace deal have now been laid.

For more visit http://www.time.com/daily

GM Loses Suit

A Texas jury ruled General Motors must pay $47.5 million to the family of a man whose neck was broken because his pickup truck did not have head restraints. But the family offered to forgo the $31 million in punitive damages if GM would recall all trucks made without head restraints.

No Third Gunman

Authorities on Thursday appeared close to ruling out the possibility of a third gunman in the Columbine High School massacre. "At this point we are still exploring the possibility of a third shooter. But we do not have a suspect in mind, and none of the physical evidence points definitely to a third person," said a Jefferson County Sheriff's spokeswoman.

Party Politics

Vice President Al Gore stepped down as guest-host for Larry King's show last night when Republicans joined forces to complain that it was unfair to give him all of that free airtime this close to the 2000 election. Gore was to lead a discussion on the Littleton, Colorado, shootings; instead he just sat in as a guest for the King-moderated program. Although Gore gave up the mike voluntarily, his spokesman said it was unfortunate that Republicans had to "inject partisan politics" into coverage of the Columbine disaster.

For more visit http://www.ew.com

FIG. 9A

Entertainment

Neeson Calls It Quits

Screen star Liam Neeson ("Schindler's List") has shocked the movie industry. The Irish-born actor told reporters in New York that he will never make another film and is quitting Hollywood in disgust after being treated like a "puppet."

TIMEdaily

Winner and Loser of the Day

Winner:
Keiko: The former star of the movie "Free Willy" is being trained to survive on his own. In preparation for the killer whale's exit from his watery Icelandic pen, Keiko is being weened of human affection. Hopes are high that this treatment of tough love may enable the whale to live on his own by the end of the year.

Loser:
Bison: A federal appeals court has announced that bison leaving Yellowstone National Park in search of winter forage may be killed. Over the past three years more than 1,200 bison have met such a fate in an effort to protect Montana's cattle from being infected with a livestock disease.

Balkans Update       TIMEdaily

Refugees Face Long Wait

Kosovo's refugees are unlikely to be home by Christmas, or even by Ramadaan (which most of them celebrate). Even if all sides agree quickly to a peace deal, the logistics of reversing the Serbs' "ethnic cleansing" are mammoth. President Clinton met ethnic Albanian refugees in Germany Thursday and vowed to guarantee their return. But the very fact of those refugees' being in Germany -- and in New Jersey -- underscores the effectiveness of Milosevic's depopulation of the region. So even as President Clinton promised that the refugees would "go home in peace and freedom," U.N. humanitarian officials coordinating relief efforts urged Western leaders to support the refugees in Macedonia and Albania through a bitter Balkan winter.

"Many other problems remain to be solved before the refugees can return," says TIME Central Europe reporter Dejan Anastasijevic. Redeploying the 40,000 Serb troops from the ravaged province will take some time, as will the assembly and deployment of an international force. Rebuilding infrastructure damaged by the war to allow for the orderly movement of some 600,000 refugees back to their villages will take many months. But most will return as soon as possible. "The refugees are mostly rural people," says Anastasijevic. "They're far too attached to their land to consider settling anywhere else."
For more visit http://www.time.com/daily

Tech News       TIMEdigital

New Standard for Music Online

Like it or not, the Net looks like the record store of the future. But how can record companies prevent downloading copyrighted music in digital form, without paying for it? Universal Records is inventing its own, brand-new digital format, one that will resist copying and that will require users to pay to download it. Universal announced Wednesday that it would try to have the new pay-for-play standard up and running by Christmas. The Recording Industry Association of America, which represents a number of big-time labels, is trying to promote its own standard under the name SDMI; apparently, Universal got tired of waiting for SDMI to materialize, so it decided to set a somewhat brisker pace.
For more visit http://www.timedigital.com

Visit us at http://www.pathfinder.com

Joe's Personalized Newspaper

Instant Delivery Edition  February 11, 1999

CLINTON IMPEACHMENT TRIAL

Majority Vote to Convict on Perjury Seems to Be in Doubt

By ERIC SCHMITT

WASHINGTON -- As the Senate privately debated for a second day whether to remove President Clinton from office, Republican support for conviction began cracking and an effort to censure the President had virtually died.

Three Republican moderates, Sens. James Jeffords of Vermont, Arlen Specter of Pennsylvania and John Chafee of Rhode Island, said they would oppose both the perjury and obstruction of justice charges. Two more Republicans said they would vote for obstruction but against the perjury charge, all but assuring that the perjury article would not receive a simple majority of 51 votes.

Jeffords said the president obstructed justice but that it did not rise to an removable offense. The senator predicted that as many as six other Republicans would vote against both charges, a forecast that if correct would mean the article on obstruction could also fail to get a majority, much less the 67 votes required for conviction.

Jeffords said he tried in his speech on the floor of the Senate on Wednesday to persuade his Republican colleagues not to buckle to pressure to convict the president. "I wanted to assure some people who were on the edge that it would be

*continued on page 7*

INSIDE THIS ISSUE

| 1 | Front Page | Majority vote to convict on perjury count in doubt<br>Miami's generations of exiles |
|---|---|---|
| 2 | Science Times | Pluto is again most distant planet |
| 3 | Technology | More States Consider Laws Restricting Junk E-Mail |
| 4 | Opinion | William Safire - Let the perp walk |
| 5 | Books | Be Cool: Chili Palmer's Latest Movie Idea |
| 6 | Arts | 1940s and 16th Century Vie for Top Oscar |

Miami's Generations of Exiles, Side by Side, Yet Worlds Apart

Special Report by MIREYA NAVARRO

MIAMI -- In a classroom of newly arrived Cubans, Alex Alvarez, a Cuban transplant himself, wasted no time recently scaring his students straight. "Welcome to the capitalist system," he said. "Each one of you is responsible for the amount of money you have in your pocket. The government is not responsible for whether you eat or whether you're poor or rich. The government doesn't guarantee you a job or a house.

"You've come to a rich and powerful country, but it is up to you whether or not you continue living like you did in Cuba."

Such warnings were not necessary 40 years ago, when Cubans fleeing Fidel Castro settled down here to await -- some to plot -- his downfall. They came from a capitalist system, with enough education and the necessary ambition to fulfill the American dream. But Castro has lasted so long that Miami now reflects different Cubas.

The people from today's Cuba, the children of the revolution, include those filling out job applications in Alvarez's class at the Training and Employment Council of South Florida, where he admonishes them, "Put down 'High School, Havana, Cuba.' Do not write 'Secundaria Ho Chi Minh.'"

The people from an earlier Cuba and their children have grown into a Miami Who's Who. The mayors of the city and county of Miami, the county police chief and the county state attorney are all Cuban-born or of Cuban descent. So are the president of the largest bank, the owner of the largest real estate developer, the managing partner of the largest law firm, nearly half of the county's 27-member delegation in the state Legislature and two of its six members of Congress.

About the only accomplishment Cuban-Americans cannot claim is regaining their country.

There's an irony and pathos about the situation," a University of Miami sociologist and expert on Cuban affairs, Max Castro, said. "They have succeeded as immigrants and failed as exiles."

That success and failure is etched on Miami, the main repository of Cuban dreams and dissent in the United States,

*continued on page 8*

FIG. 11A

NATIONAL
Science/Health
Pluto Is Again Most Distant Planet

By The Associated Press

WASHINGTON (AP) -- Tiny Pluto slips outside the orbit of Neptune today to resume its role as the farthest planet from the sun.

This return to normal comes just days after the littlest planet survived an attack that threatened to strip it of its planetary status altogether.

Normally the most distant planet, Pluto has an unusual orbit that takes 248 Earth-years to complete one trip around the sun. During just 20 of those years, it moves inside Neptune's orbit to become the eighth planet instead of the ninth.

Pluto moved inside Neptune's orbit on Feb. 7, 1979, and was on course to cross back outside at 5:08 a.m. EST today, scientists at the National Aeronautics and Space Administration calculated.

Pluto will remain the most distant planet for the next 228 years.

Just last week, the Paris-based International Astronomical Union, the world's leading astronomical organization, reaffirmed Pluto's standing as the smallest planet.

News reports had said Pluto might be demoted to a minor planet, or -- worse -- a trans-Neptunian object.

"No proposal to change the status of Pluto as the ninth planet in the solar system has been made by any division, commission or working group of the IAU responsible for solar system science," said the 80-year-old organization, the final authority on astronomical matters.

Even though Pluto was crossing Neptune's orbit, there was no worry about a collision. NASA said, because the planets were going to be far apart at the time.

Pluto was discovered Feb. 18, 1930, by Clyde Tombaugh at Lowell Observatory in Flagstaff, Ariz. Its moon, Charon, was found in 1979.

With a diameter of 1,430 miles, Pluto is less than half the size of any other planet and only two-thirds as big as Earth's moon. ✦

Childbirth: Fertility Clinics' Boom in Babies

By THE ASSOCIATED PRESS

The Centers for Disease Control and Prevention reports that fertility-enhanced births nationwide jumped 25 percent in a year but cautions that the sharp increase may be due to better reporting, not necessarily a rise in the number of women seeking help from fertility clinics.

"It's premature to draw too many conclusions about a trend between last year and this year," Dr. Lynne Wilcox, director of the centers' Division of Reproductive Health, said last week.

In the survey, 300 fertility clinics reported that their clients had 14,388 live deliveries from pregnancies that began in 1996. That was up from 11,516 reported the year before by 281 clinics.

The data were included in the centers' annual consumer guide to fertility clinic success rates. It was only the second time the agency had released such a report, which was required by Congress.

The report does not rank or grade the clinics because some specialize in more difficult fertility cases and have naturally lower success rates. But it includes other data like the "take-home baby rate," the multiple-birth rate and the number of embryos each clinic uses. About 38 percent of the deliveries reported in this year's guide were multiple births, up from 37 percent the year before. ✦

IN BRIEF

Study Links Scars to Breast Cancer

By THE ASSOCIATED PRESS (February 11) A microscopic change in breast tissue can help doctors predict whether a woman whose biopsy is benign may develop cancer, researchers reported today in the New England Journal of Medicine. ✦

Anti-Cancer Drug To Be Tested

By THE ASSOCIATED PRESS (February 11) Government scientists have finally been able to reproduce a scientist's highly publicized results for an anti-cancer drug and are now seeking to begin the first human tests. The Boston Globe reported today. ✦

FIG. 11B

Technology
More States Consider Laws Restricting Junk E-Mail
By JERI CLAUSING As lawmakers around the country discover that their constituents are concerned about Internet issues, bills to regulate or outlaw junk e-mail are popping up in state legislatures. Three laws restricting junk e-mail are already on the books, and lawmakers are considering four more.

Advocates of the laws say they are encouraged by the new interest state lawmakers are taking in protecting consumers and Internet service providers from the scourge of junk e-mail, dubbed "spam" by annoyed recipients. However, they are also concerned that a patchwork of different laws across the country could hamper legitimate online marketing.

"We would prefer a single good federal law, but if we can't find a federal solution we're going to have to work state by state," said John Mozena, a board member of the Coalition Against Unsolicited Commercial E-Mail (CAUCE).

"The problem is, that would also make it much harder for people playing by the rules, and we don't want to make it difficult for people to do authentic business online," Mozena said. "We just want them to be paying their own freight. But we will take 50 state laws, so be it, if we can't get a federal law."

Legislators adjourning for their 1999 sessions have introduced proposed spam laws in Texas, Virginia, Washington and Maryland. More are expected before lawmakers in other states wrap up this year's business.

In the last Congress, CAUCE had been pushing for federal legislation to amend an existing junk fax law to also outlaw unsolicited junk e-mail. That bill, which was sponsored by Representative Chris Smith, a New Jersey Republican, made little headway. Instead, the Senate passed a proposal by Senators Robert Torricelli, a New Jersey Democrat, and Frank Murkowski, an Alaska Republican, that would have regulated junk e-mail by requiring that it be labeled as advertising and that senders provide an easy way for recipients to get off their mailing lists. Although that bill never made it through the House, the senators are expected to introduce a new version this year.

The Murkowski-Torricelli bill has been favored by the Direct Marketing Association (DMA). But groups like CAUCE say it still fails to address the issue of cost. Internet service providers pay for the cost of processing millions of pieces of junk e-mail, and some Internet users must pay their ISP or phone company for the time they spend downloading spam.

In a surprise announcement in December, CAUCE and the DMA said they had reached a tentative agreement on principles for new federal legislation. But Mozena said in a telephone interview last week that his optimism about finalizing that agreement was waning.

For now, he said, CAUCE is working with state lawmakers around the country, trying to add to the list of three states that already have laws restricting junk e-mail. He said the

*continued on page 9*

IN BRIEF
Court Upholds Internet Office Ban
By THE ASSOCIATED PRESS

A federal appeals court has upheld a Virginia law that prohibits state employees from looking at sexually explicit material via the Internet while at work. ♦

National Security and the Net
By JERI CLAUSING

In a preview of what promises to be increasing clashes between national security interests and the Internet, House Commerce Committee members began debating whether or not Congress should limit the posting online of unclassified but sensitive information about potential disasters at the nation's chemical plants. ♦

Shareholders Sell E*Trade
By DAVID CAY JOHNSTON

Several major investors in the E*Trade Group, the online brokerage firm whose trading system was down for several hours on three days last week, sold big chunks of stock last week just before the outages. ♦

Sun in Deal With AOL
By BLOOMBERG NEWS

Sun, one of the biggest makers of computers that run Internet sites, will pay AOL a minimum of about $1.28 billion over three years as part of their agreement to sell Netscape software. ♦

FIG. 11C

ESSAY / By WILLIAM SAFIRE

Let the Perp Walk

Washington -- The System worked. What a great country.

Remember, only a couple of months ago, all those dire warnings out of the White House about the "national paralysis" that impeachment by the House of Representatives would bring? A parade of sleazy witnesses and a flood of pornographic evidence would, the Clintonites threatened, tie the Senate in knots throughout 1999. Furious partisanship would surely rip apart the political fabric.

That did not happen. The House ignored the threats and went ahead with the first impeachment of an elected President. The Senate majority leader made good on his prediction that the trial would take weeks, not months. And while the voices of a prosperous people murmuring "don't make waves" were listened to, the historic point was also made that the abuse of executive power in America has its consequences.

Were it not for the impeachment process, the notion that the Clinton scandals were "just about sex" would have prevailed. The President's behavior would have been tut-tutted at, but the focus would have been on bluenosed intrusion into private sin rather than the use of the power of the Presidency to defeat a civil rights lawsuit and impede a Federal grand jury.

That triumph of spin did not happen either. What did happen? In light of the voters' decision last November that punishment for high crimes was unwanted, the most that proponents of equal justice under law could hope for was public understanding of the damage Bill Clinton had done.

However the vote goes this week, the connect-the-dots presentation by the managers to the Senate persuaded most Americans paying attention that the President has (1) directed a campaign of lies and would still be lying were it not for the blue dress; (2) disregarded the privacy rights of those who dared to call him to account, and (3) delivered a heavy blow to the sanctity of the oath in courts of law.

Removal of a President in the absence of public outrage would be a Draconian mistake. Impeachment was an ineradicable mark on his record; the Senate trial was public purgatory. That's a powerful warning to future Presidents contemplating obstruction. The principled majority of senators can vote to remove Clinton confident that a nullifying minority will make their condemnation purely symbolic.

Censure afterward? That would assuage the consciences of many who feel guilty about casting a vote that effectively condones the abuses of power. But that grand straddle would engrave over the portals to the Senate the initials "C.Y.A."

In such extraconstitutional punishment-by-exhortation, reputation, not retribution, is paramount: to its compromising proponents, it matters not if you convict or acquit, but how you blacken the name.

No, impeachment and its brief but educational trial will do. Senators worried about history or the next election can justify their acquittal votes with speeches in a final chapter to the official document titled "Not Guilty With an Explanation."

Clinton and his allies, in reacting to acquittal, will not be so foolish as to repeat the pep rally after the House impeachment. No champagne corks will publicly pop; sobriety with a pinch of contrition will be the message of the day. But the spin machine, by its nature, cannot stop itself from pumping out "much ado about nothing; purely partisan; all about sex."

Moreover, its Justice appointees (fresh from a cover-up of the Asian connection) will seek to get even with Ken Starr, even as its Carvilles will try to purge those Republicans who dared to speak truth to the power-abusive. That's making a move on "moving on."

We who keep hope alive that more of the story will be forced out can count on that knee-jerk, war-room reaction of the most vindictive Clintonites.

Starr's non-Monica reports may be mired in molasses, but likely to come are memoirs of disillusioned aides, toots from whistleblowers and straight reporting about an unraveling Administration (and its I.R.S.). These sources may open some of the hatches that Ruff, Lindsey & Co. has so fiercely battened down.

That's why we can take heart at how The System Worked.

We underestimated the House and it did itself proud. We trusted the Senate and it went by the constitutional book. Thus can the nation say, with Vernon Jordan, "Mission accomplished." ♦

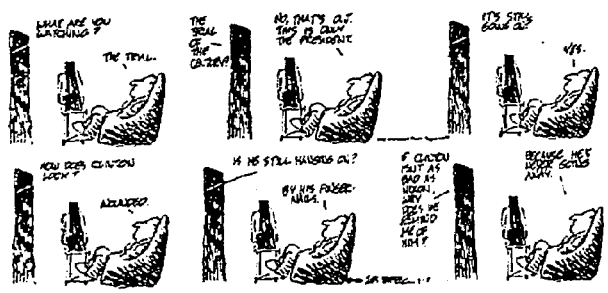

FIG. 11D

HP Instant Delivery Times
*Shortcuts, Solutions and More*

May 1999

HP Instant Delivery - Designed for HP Printers

All brand and product names are trademarks or registered trademarks of their respective companies.

www.instant-delivery.com

The HP Instant Delivery newsletter has a new name! You'll get the same great helpful tips, just a slightly different name.

Beginning in June, HP Instant Delivery Times will be issued monthly. Make sure you update your subscription to the first Monday of every month!

New Version!
A new version of Instant Delivery will be available on May 8. HP Instant Delivery will automatically notify you when the new version is ready or you can go to the web site to download it. Here are some highlights of the new version:
- You can set up HP Instant Delivery to print your deliveries only when they have changed. This new feature allows you to print documents that are updated at irregular intervals. HP Instant Delivery will check as often as you like, but will only print when the content has been updated. There may be cases when pages that have not changed do print. Check Help to learn more.
- HP Instant Delivery works even harder to print your deliveries.

HP Instant Delivery Publisher Updates
Like baseball? CBS SportsLine features Major League Baseball. Go to the Featured Publishers page and click on Major League Baseball News to add daily delivery of the latest baseball action.

Get in touch with hometown news! From the Featured Publishers page click on Your Local News to sign up for your local newspaper. If your local paper is not listed, use the Feedback from the navigation bar to send us a message and we will try to add it.

We've added 25 more publications to the Catalog of Publications section of our web site. Keep checking our site, as we will always be adding more.

New look!
Starting in June our site will have a new look! Coming soon you can preview the site at beta.instant-delivery.com. Send Feedback to let us know what you think.

FIG. 12

AUTOMATED CONTENT HANDLING SYSTEM AND RELATED METHODS

RELATED INVENTIONS

The present invention is a continuation-in-part of U.S. application Ser. No. 09/325,040 filed on Jun. 7, 1999 entitled Document Delivery System for Automatically Printing a Document on a Printing Device, by Brewster, et al.

TECHNICAL FIELD

This invention generally relates to the printing field and, more particularly, to a document delivery system for automatically printing a document on a printing device.

BACKGROUND

In the mid-1400's, Johann Gutenberg revolutionized how information is disseminated through his invention of the movable type press. With the publication of the Mazarin Bible, documents which were once held in the exclusive domain of a chosen few were now widely available to the masses. Nearly 550 years later, the mass media revolution that Gutenberg started is alive and well, complete with newspapers such as the New York Times and the Washington Post, magazines such as Newsweek and Sports Illustrated, and literally thousands upon thousands of other publications.

While these thousands of publications cover a wide range of interests, from news to sports to fashion to model rocketry, they have one thing in common: they are intended to be read by a mass market. Unlike the pre-Gutenberg days, where a document would literally be read by only one person of a very small number of people, it is not economically viable for today's publications to have such a small readership, due at least in part to high marketing, production and distribution costs. In fact, many of today's publications are funded to a very large extent by the advertising contained within them. These advertisers are attracted to publications that can consistently deliver a large, reliable audience of consumers that will be exposed to their advertising.

While this mass-market publication model has worked well for hundreds of years, it is not without its problems. One such problem is that a typical reader of a publication has a wide variety of interests, and no single mass market publication will be able to satisfy all of these interests. For example, a reader who is interested in international news, golf, fly-fishing, Genealogy, and computers may have to subscribe to several different publications to satisfy these interests. Of course, since these publications are intended for the mass market, they will also contain a significant amount of material that our reader is not interested in and will not read. It goes without saying that if there is a significant amount of material a read isn't reading, there is a significant amount of advertising that the reader isn't reading either—as well as a significant amount of paper that is wasted. Advertisers know this, and agree to pay considerably less to a mass market magazine or newspaper per 1000 exposures to their ad than they would pay to a direct-mail generator that can provide a more specific guarantee that the people exposed to their ad are of a demographic group that will be much more likely to read their ad and be interested in it.

In addition, it is neither cost-effective nor time effective for most readers to subscribe to and/or read a large number of publications. Generally, the typical reader will only subscribe to a few publications that are of the most interest to them. The reduced readership level of the publications our typical reader chooses not to subscribe to, even though she might be interested in at least some of the editorial and advertising content contained inside, means that the publication receives less subscription and advertising revenue than they otherwise would. If many other readers make the same decision, the continued health of the publication may be in jeopardy, and the publication may be forced out of business. In fact, many publications do go out of business yearly for failing to attract a sustaining number of advertisers and readers—even if there are a large number of readers that would be interested in reading their publication, and a corresponding number of advertisers anxious to have these readers exposed to their ads. In general, publications that fail to attract a substantial mass market of people willing to pay for and/or read them cease publication. This is a shame, since many of these publications would enrich the diversity of information available to all readers, and would provide an avenue for lesser known writers and artists to practice their wares.

In more recent years, a new type of publication has emerged: the electronic publication. Readers of these publications typically sign into the Internet through their computer, and read the publications online. Some of these publications, such as CNN.com and pointcast.com, allow users to state personal preference on what type of material they would like to read. Often, these personalized publications include advertising, usually in the form of a banner ad that is placed on along a periphery of the visual display (top, bottom, side, etc.).

While these electronic publications have been an interesting development in the distribution of information, they still represent only a tiny fraction of the information that is published under the more traditional post-Gutenberg model. Many readers of these electronic publications complain that they are very difficult to read (on the video display), especially for long periods of time. While it might be convenient for a reader to sign onto the Internet to look at the CNN.com web site for a brief summary of late breaking news, this reader would most likely only spend a few minutes at the site, and would likely still subscribe to the more traditional print media such as Newsweek or the Washington Post. They would also likely spend significantly more time reading the more traditional printed publication than they would spend reading the electronic publication, and correspondingly, spend more time being exposed to the ads in the traditional printed publication. Accordingly, printed publications continue to flourish today—more than five centuries after Gutenberg made them possible—and after more than a decade after the innovation of the electronic publication.

While these printed publications have certainly benefited modern society, no significant attempt has been made thus far to solve the underlying problems with these publications discussed above. Just such a solution is provided herein.

SUMMARY

In accordance with the teachings of the present invention, a content handling system and related methods is presented. According to a first embodiment, a method is introduced method comprising issuing a plurality of instructions to a requesting computer to render content, the plurality of instructions including at least a subset which are interpreted to render an iconic selector associated with a service, wherein user selection of the iconic selector generates a request to download, subscribe to, index and/or print content from the service, and fulfilling the request(s) without requiring further input from the user.

BRIEF DESCRIPTION OF THE DRAWINGS

FIG. 5 illustrates how user profile information is acquired from a user in one embodiment of the invention;

FIG. 6 shows how user profile information is acquired from a user in one embodiment of the invention;

FIGS. 9A–9B shows a document printed by the printing device according to one embodiment of the invention;

FIG. 10 shows a document printed by the printing device according to one embodiment of the invention;

FIGS. 11A–11D show a document printed by the printing device according to one embodiment of the invention;

FIG. 12 shows a document printed by the printing device according to one embodiment of the invention;

DETAILED DESCRIPTION

Figure 1:
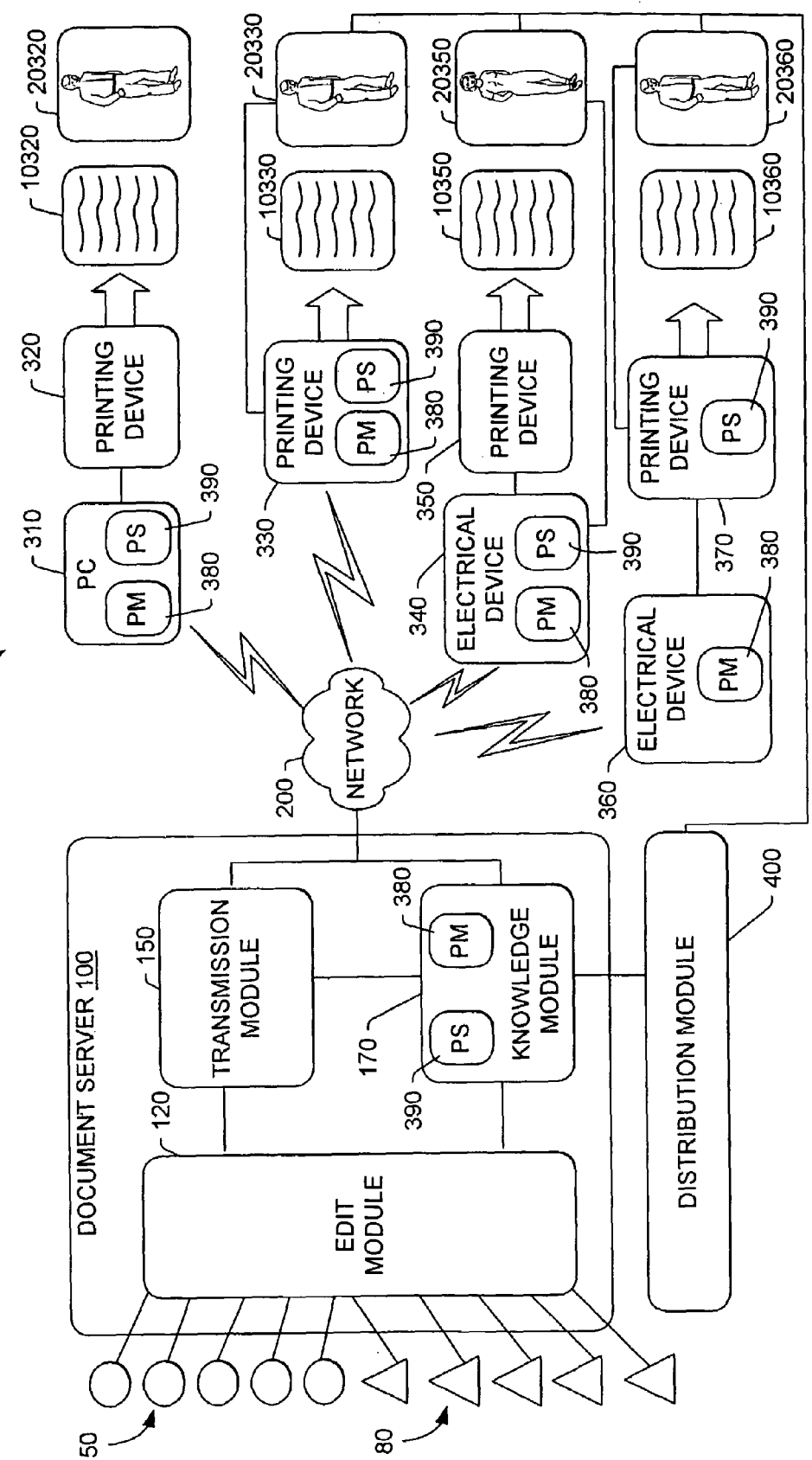
FIG. 1 shows a block diagram of a document delivery system of one embodiment of the invention.

FIG. 1 illustrates a block diagram of a document delivery system of one embodiment of the invention. Document delivery system 10 contains document server 100. In the preferred embodiment, document server 100 is operatively coupled via network 200 to a variety of personal computers, printing devices, and other electronic devices, collectively referred to as devices 300. Document server 100 contains edit module 120, transmission module 150 and knowledge module 170. Edit module 120 receives inputs from one or more content providers 50, and/or one or more advertising providers 80. Distribution module 400 is operatively coupled to document server 100. In a preferred embodiment, document server 100 is a minicomputer/server, such as an HP 9000 server sold by the Hewlett-Packard Company, although those skilled in the art will appreciate that document server 100 could be any type of other computing or electronic device(s) that performs the functions described herein and still fall within the spirit and scope of the invention. Network 200 is preferably the Internet, although an Intranet, local area network, or other type of public or private network, either wired (e.g., telephone, cable TV, etc.) or wireless (e.g., satellite, radio, cell phone, etc.), could also or additionally be used. According to one aspect of the present invention, to be developed more fully below, document delivery system includes automated content handling facilities. More particularly, devices 300 include a content handler (see, e.g., FIG. 13), which is responsive to an iconic selector embedded in rendered content to automatically subscribe a user to receive available content (e.g., electronic publications, multimedia content, services, etc.), index available content, and/or automatically print available content without modifying the rendered content and without requiring further user input.

Devices 300 are shown in FIG. 1 as being capable of being configured in a wide variety of ways. For example, personal computer 310 is shown connected to printing device 320, which prints document 10320 for user 20320. Personal computer 310 is operatively coupled to network 200. In contrast, printing device 330, which prints document 10330 for user 20330, is operatively coupled to network 200 without an intervening personal computer or other electronic device. Printing device 350, which prints document 10350 for user 20350, is shown connected to electronic device 340, which could be a set top box, television set, palmtop personal digital assistant (PDA) or other type of electronic device that is operatively coupled to network 200. Finally, printing device 370, which prints document 10370 for user 20370, is connected to electronic device 360, which is operatively connected to network 200. The printing devices shown in FIG. 1 could be printers, such as the HP DeskJet 890 printer, HP LaserJet V printer, or other models of printers manufactured by Hewlett-Packard (HP) or others; so-called "mopiers" or other multi-function printing devices that can print, fax, scan, and/or copy, or any other device capable of transferring information to a printable media such as plain paper, specialty paper, transparencies, or other media capable of tangibly receiving such information and which can be easily carried about by the user.

As shown, document delivery system 100 includes printing module 380 and a transmission module 150. Transmission module is preferably located with document server 100. As FIG. 1 shows, printing module 380 could be located in any of the devices 300, such as in personal computer 310, printing device 330, or electronic device 340, operatively coupled via network 200 to document server 100, or it could be located within document server 100 itself, such as in knowledge module 170. According to one embodiment of the invention, transmission module 150 and printing module 380 represent software functions that execute on suitably programmed microprocessor(s) within a device 300 and/or document server 100. It will be appreciated, however, that special purpose hardware or other mechanisms could be employed to implement the innovative features and functions described below. According to one embodiment, printing module 380 may well be located within a content handler (not shown) located in one or more of devices 300, described more fully below, to implement aspects of the present invention.

Figure 13:
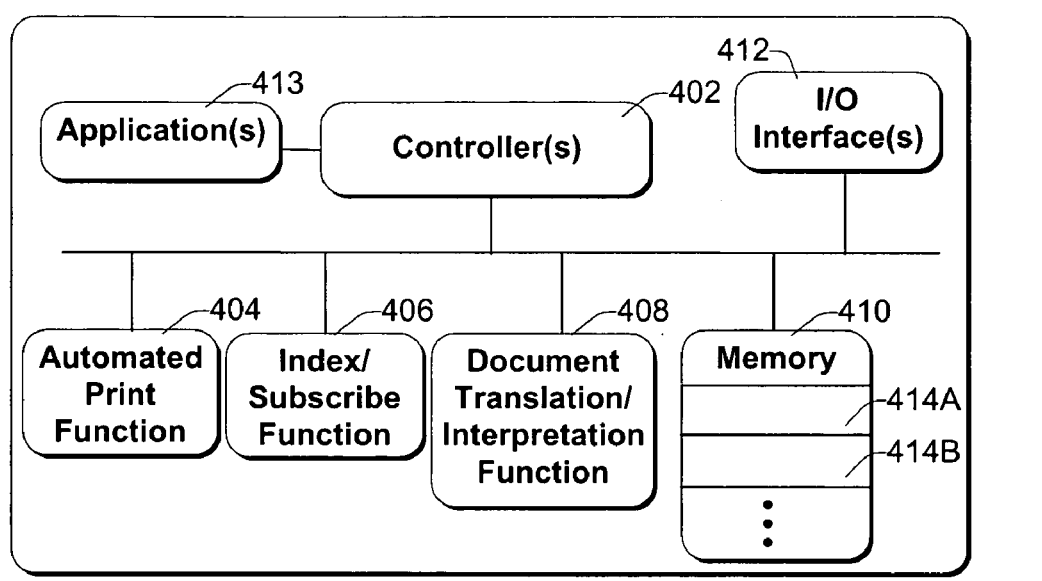
FIG. 13 illustrates a block diagram of an example content handler, according to one aspect of the present invention.

Turning briefly to FIG. 13, a block diagram of an example content handler 401 is presented, according to one embodiment of the invention. According to one embodiment, to be described more fully below, content handler 401 resides within one or more of devices 300 and, in response to user interaction with an iconic selector rendered within a user interface (e.g., web page, email, word processing document, etc. (not shown)) of device 300, automatically subscribes a user to periodically receive content, indexes content for later use and/or automatically retrieves and prints content denoted by the iconic selector without modifying the rendered content on the display and without requiring further user input. Any of a number of user interfaces may be used to utilize the features and functions of printing module 380. According to one embodiment, to be described more fully below, a web page is projected to a device 300 by document server 100, content provider 50 and/or advertisers 80, wherein the web page includes one or more iconic selector(s) associated with available content. According to one aspect of the invention, the instructions for rendering the iconic selector include an action designator to selectively invoke one or more functions of content handler 401, and a network address denoting the location of the available content. As used herein, the content may well include an electronic publication, multimedia content, a service and the like.

As shown in FIG. 13, content handler 401 includes one or more controller(s) 402, an automated print function 404, an index/scheduling function 406, a document translation/interpretation function 408, a memory/storage system 410, an input/output (I/O) interface 412, and optionally one or more applications 413, each coupled as shown. It will be appreciated that, although denoted as separate functional blocks, one or more elements 402–413 may well be combined without deviating from the spirit and scope of the present invention. Similarly, although denoted in the context of a single functional entity 401, it is to be appreciated that one or more elements of content handler 401 may well be remotely located, i.e., within document delivery system 10. In one implementation, for example, index/scheduling function 406 is located at document delivery server 100. Although depicted in accordance with a hardware paradigm, those skilled in the art will appreciate that content handler 401 and its associated elements 402–413 may well be embodied as a series of executable instructions which, when executed by a host processor of devices 300, implement the features and functions of content handler 401 to be discussed below. In this regard, FIG. 13 is merely illustrative of the scope and spirit of the claimed invention.

As shown, controller(s) 402 selectively invoke one or more functions 404–408 and/or applications 413 in response to user interaction with a user interface. According to one embodiment, the user interface includes iconic selectors, e.g., buttons, which when selected by the user causes controller 402 of content handler 401 to selectively invoke an instance of a function associated with the selector. In this regard, controller 402 communicates with external elements via input/output (I/O) interface(s) 412. In an alternate embodiment, controller 402 provides a user with a user interface from applications 413.

As used herein, I/O interface(s) 412 are intended to include one or more of any of a number of communication interfaces known in the art including, but not limited to, a direct connect communication interface (e.g., a serial interface, a parallel interface, a Universal Serial Bus (USB), an Advanced Graphic Port (AGP), etc.), a local area network interface (e.g., an Ethernet interface, a Token Ring interface, etc.), or a wide area network interface. In this regard, content handler 401 may well communicate with any of a number of external and remote devices using an appropriate one of a plurality of wired and/or wireless I/O interfaces 413.

Automated print function 404 is selectively invoked by controller 402 in response to a user indication to immediately print a document (e.g., within the next several seconds) without first viewing or displaying the document. According to one implementation, automated print function 404 is an embodiment of print manager 380. According to one embodiment, content projected by an external source (e.g., document server 100, content provider 50, advertiser 80, or any third-party provider of content) includes an iconic selector associated with available content, wherein the action designator denotes the "print" function. When the iconic selector is selected by a user, controller 402 receives one or more instructions with at least an action designator and the network address of the content. According to one implementation, user interface provides controller 402 with a name/identifier and storage location of the one or more documents. Controller 402 provides the name/identifier and location information to automated print function 404 to queue the document for printing. As will be described in more detail below, automated print function 404 generates and issues a request to retrieve the identified document(s) from the identified storage location via I/O interface 412. The retrieved documents are stored in memory locations 414A, 414B, etc. of memory 410. Once retrieved, document translation/interpretation function 408 is selectively invoked to interpret/translate and print the retrieved document, without displaying the retrieved document. According to one implementation, the retrieved documents are queued and printed substantially instantaneously (e.g., within the subsequent several seconds). In alternate embodiments, the retrieved document(s) are printed according to a print schedule defined by the user. In one embodiment, the instructions are received from a document delivery server 100 within document delivery system 10. It should be noted that the document delivery server 100 may or may not be denoted as the provider of content within the instructions of the iconic selector. Regardless, as will be described more fully below, a document delivery server 100 receives detects the user selection of the iconic selector to ensure that the computing device 300 includes the content handler 401. If it does not, the user is provided with an opportunity to receive and install content handler 401 in their computing device 300.

According to one aspect of the invention, to be described more fully below, the document associated with an iconic selector is retrieved from a provider into memory 410 of content handler 401 and immediately printed without invoking an application associated with the document. That is, translation/interpretation function 408 reads the stored document(s), interprets the textual, image, formatting, etc. content of the document(s) to print the document on an operatively coupled printer without having to invoke the application associated with the retrieved document(s), and without having to display the document(s) to the user prior to printing.

In an alternate embodiment, an application 413 (e.g., Microsoft Word, Adobe Acrobat, etc.) associated with the document is invoked by controller 402 to print the document, but neither the document nor the application 413 are displayed to the user so, from the user's perspective, the application is not launched. In either case, automated print function 404 enables a user to immediately print a remote document without having to manually download, launch and print the document, thereby providing the user with the convenience and selection of electronic publications, with the physical reading experience introduced by the Gutenberg press.

The index/scheduling function 406 is selectively invoked by controller 402 in response to user selection of an iconic selector to automatically subscribe a user to receive content (denoted by a network address in the instructions of the iconic selector) on a periodic basis, and/or to index the network address for future access. When an iconic selector including the "subscribe" action designator is detected, a subscribe command is issued from a document delivery server 100 to content handler 401, whereupon index/scheduling function 406 is invoked to automatically subscribe the user to the content and/or service. More specifically, index/scheduling function 406 adds the denoted content/service to a print schedule. According to one implementation, the print schedule is maintained locally, within content handler 401, to maintain a list of periodically retrieved content. In some implementations, the content handler 401 may need to periodically check with the other component(s) of document delivery system 10 to receive commands. According to an alternate implementation, the printing schedule is maintained elsewhere within document delivery system 10 (e.g., at document delivery server 100), which selectively issues "print" commands to local content handlers 401 within devices 300 to periodically provide the content to the subscribing user.

According to one aspect of the invention, index/scheduling function 406 subscribes the user to the denoted content/service without modifying the currently rendered content (e.g., web page, email, etc.) for the user, and without requiring any additional information from the user. In this regard, index/scheduling function 406 benefits from user profile information, dynamically acquired and maintained within document delivery system 10. According to one implementation, document delivery system 10 maintains user profile information for each user. This user profile information may well be stored locally (e.g., within memory 410 of content handler 401), or may be retained within network 10 (e.g., within knowledge module 170).

In addition to the subscription facilities described above, index/scheduling function 406 may also be invoked by controller 402 to add the denoted content to an index of preferred content. That is, upon receiving a command containing an "index" action designator, controller 402 of content handler 401 selectively invokes index/scheduling function 406 to add the network address associated with the content to a list (or index) of preferred content. In one implementation, index/scheduling function 406 may add the content itself and/or an network address denoting the content to the index. According to one implementation, the list is maintained by another application (e.g., a web browser) resident on the device 300. Alternatively, the list is associated with and maintained by one or more elements of the document delivery system 10, and resides within one or more of content handler 401, document delivery server 100, knowledge module 170, device 300, and the like.

Figure 2:
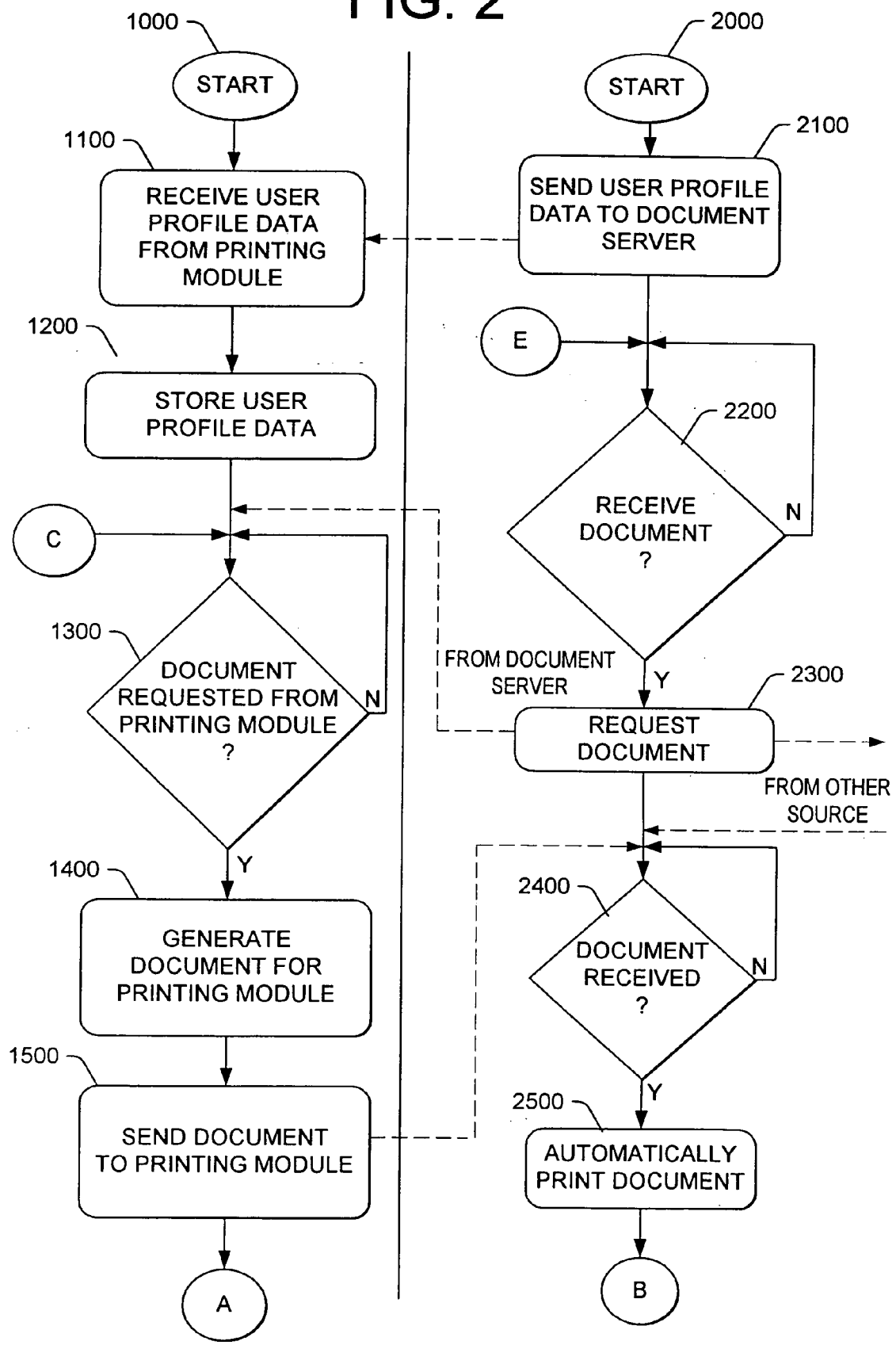
FIGS. 2–4 illustrate flow charts detailing the operation of the transmission module and the printing module of the document delivery system of one embodiment of the invention.
Figure 3:
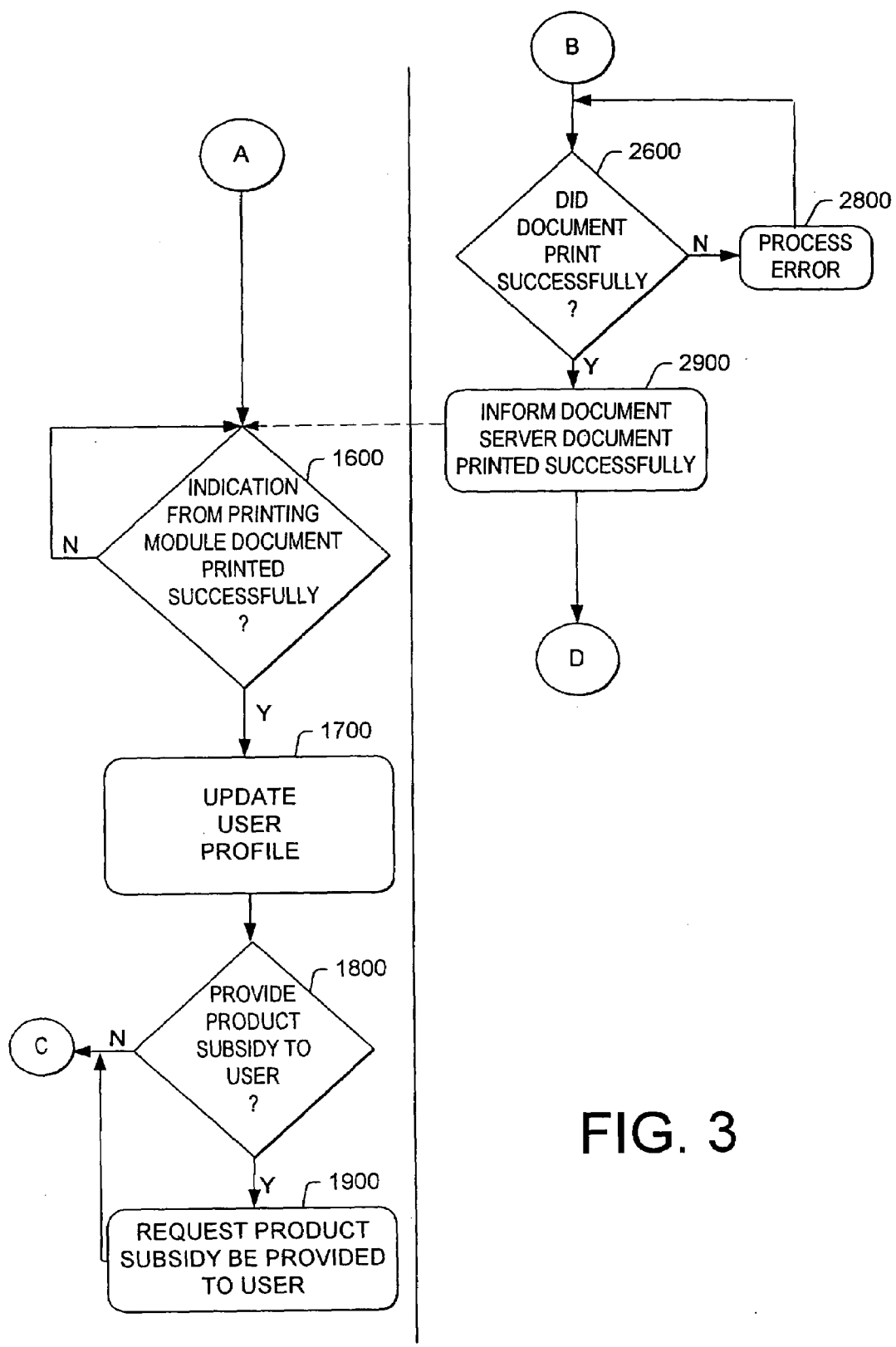
Figure 4:
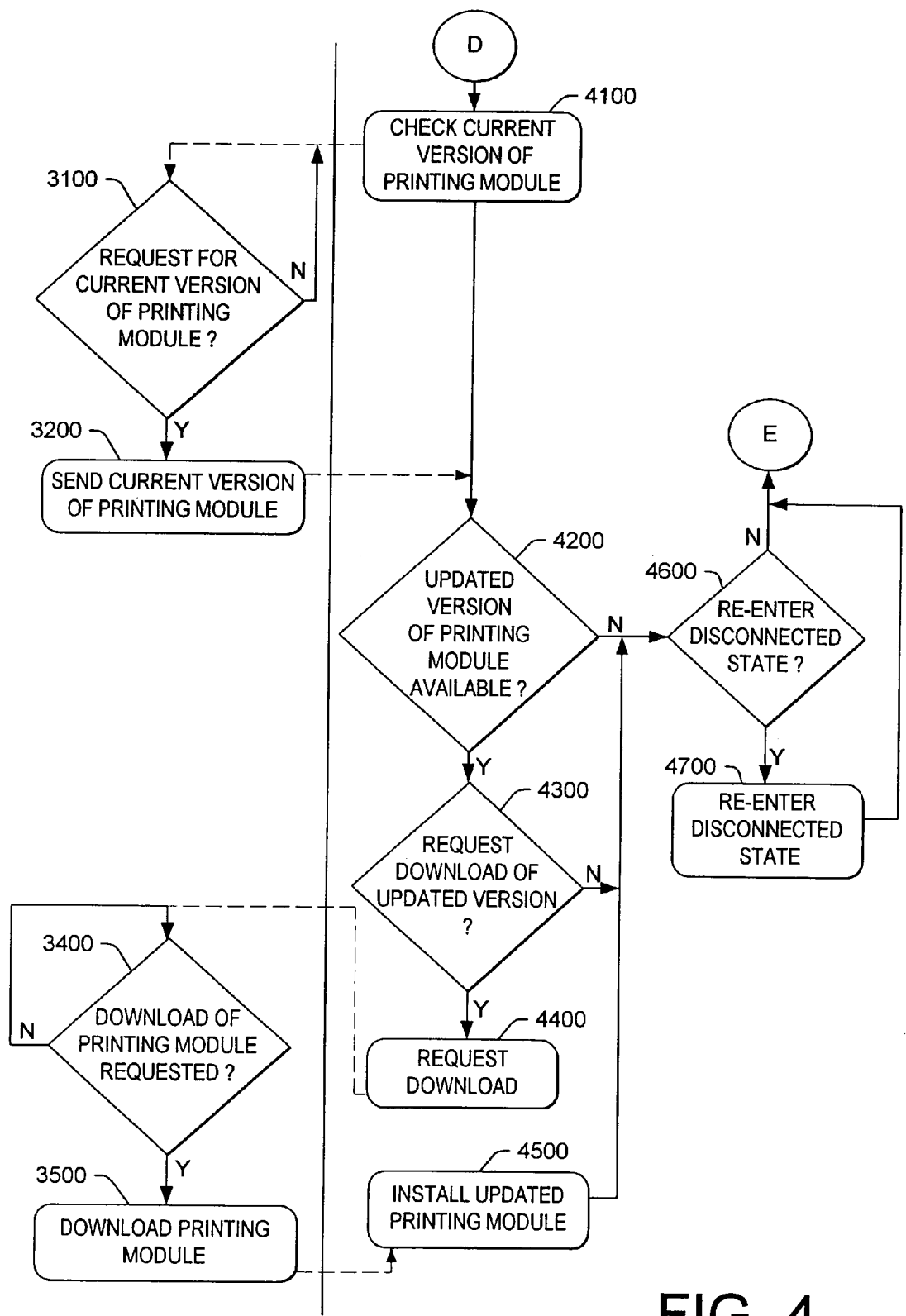

Turning to FIGS. 2–4, flowcharts detailing the operation of transmission module 150 and a first mode of operation of printing module 380 are presented, according to one embodiment of the invention. In FIGS. 2–4, the flow diagram shown in the left column is executed by transmission module 150 of document server 100, and the flow diagram in the right column is executed by printing module 380.

Referring now to FIG. 2, the flow diagram for transmission module 150 starts in block 1000, and the flow diagram for printing module 380 starts in block 2000. Since there is a great deal of interaction between these two flow diagrams, as represented by dashed lines connecting the two columns, the operation of the two flow diagrams will be described simultaneously.

Figure 5:
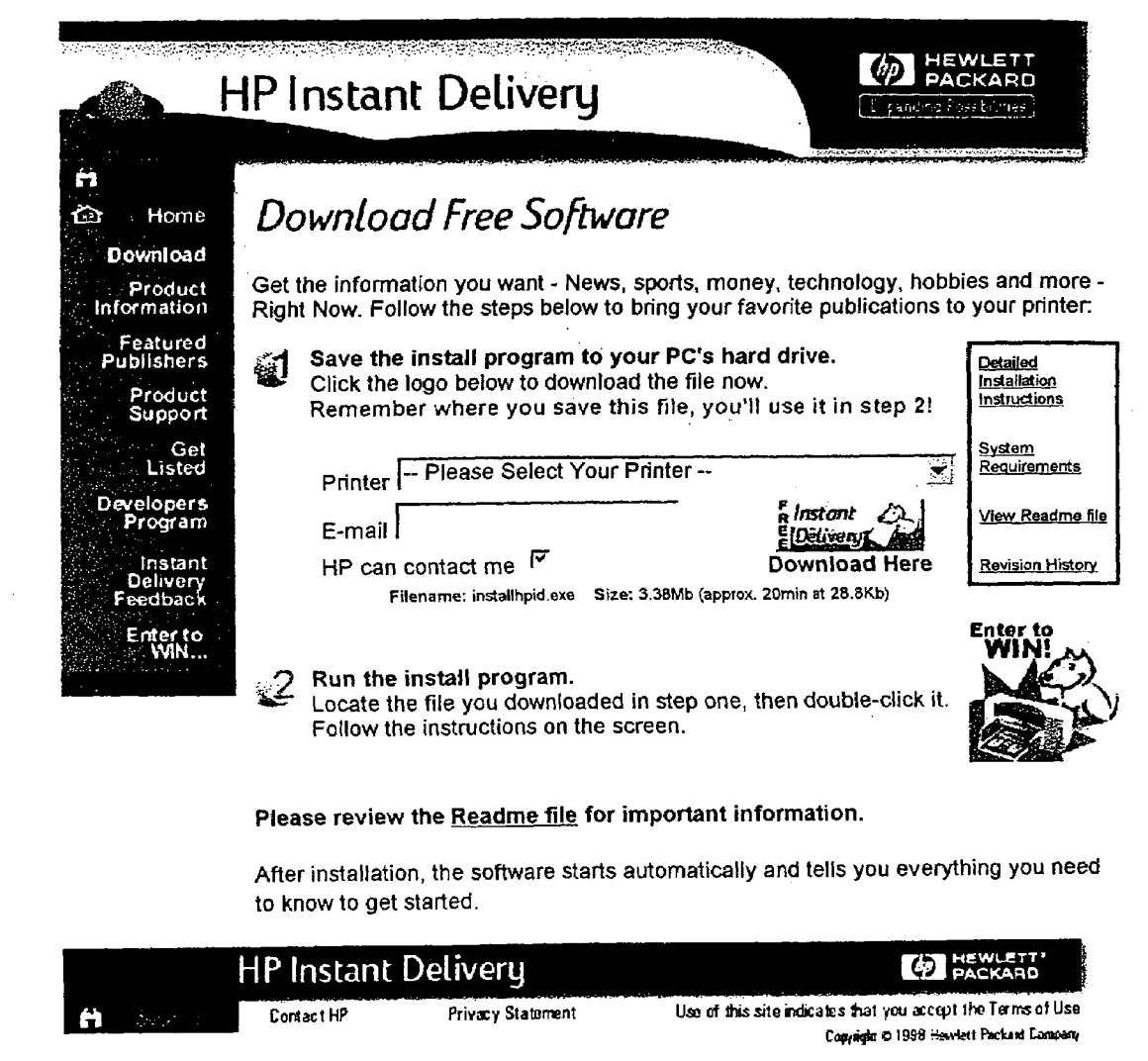
Figure 6:
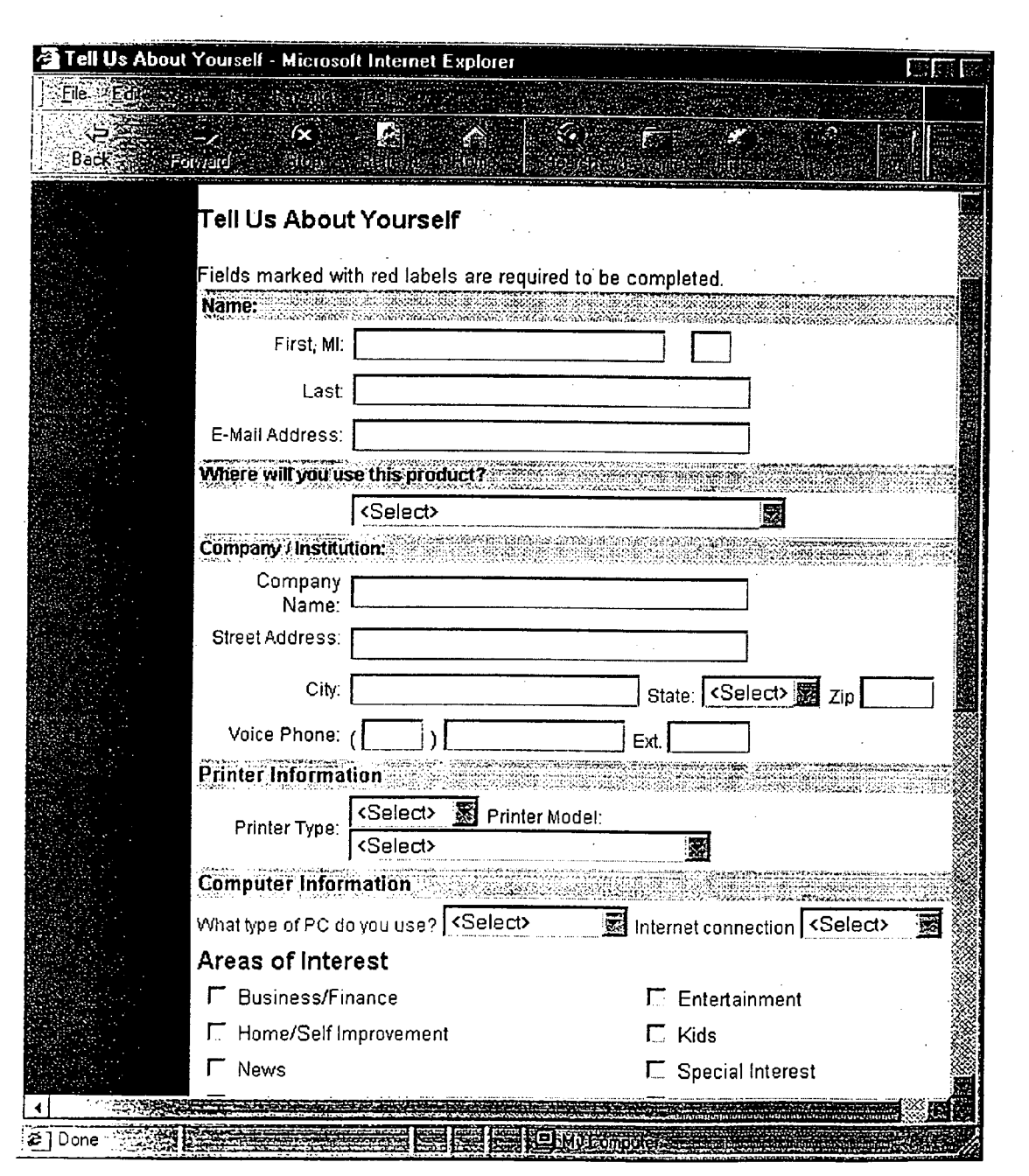

In block 2100, user profile data is sent to document server 100 to be stored in the user profile. This user profile data can take on many different forms, from simple to very detailed. FIG. 5 shows a very simple acquisition of user profile data, such as that used in HP's Instant Delivery Program. In this program, only three pieces of information are stored in the user profile: type of printer, email address, and whether HP can contact the user. FIG. 6 shows a more complicated user profile which includes the user's name, email address, company name, city, state, country, zip or postal code, phone number, printer information, and areas of interest. Those skilled in the art will appreciate that more or less user profile data from those shown in FIGS. 5 and 6 could be sent to transmission module 150 in block 2100 and still fall within the spirit and scope of the invention, and that at least some of this information could come from a source other than a user. For example, the user profile data could also include household income, age, and sex of the user, among other things. In any event, block 1100 receives the user profile data sent by block 2100. Block 1200 stores the user profile data, preferably in knowledge module 170. Alternately, the user profile data could be stored in device 300 or in some other local or remote location.

Block 2200 checks to see whether a document should be received form document server 100. This is done by checking print schedule 390 which is preferably stored on a device 300 or document server 100, but may be stored in some other local or remote location. Printing schedule 930 preferably contains information that can be used to determine when documents should be printed by the printing device, such as upon document creation, user requested time, lapse of specified time period, and/or occurrence of one or more external events (e.g., a stock price or index reaching a specified value, a final score of a sporting event, etc.). Printing schedule 390 may be associated with an individual user, a device or a group or users and/or devices. In addition, each entry of printing schedule 390 could result in the printing of one or more documents.

Figure 7:
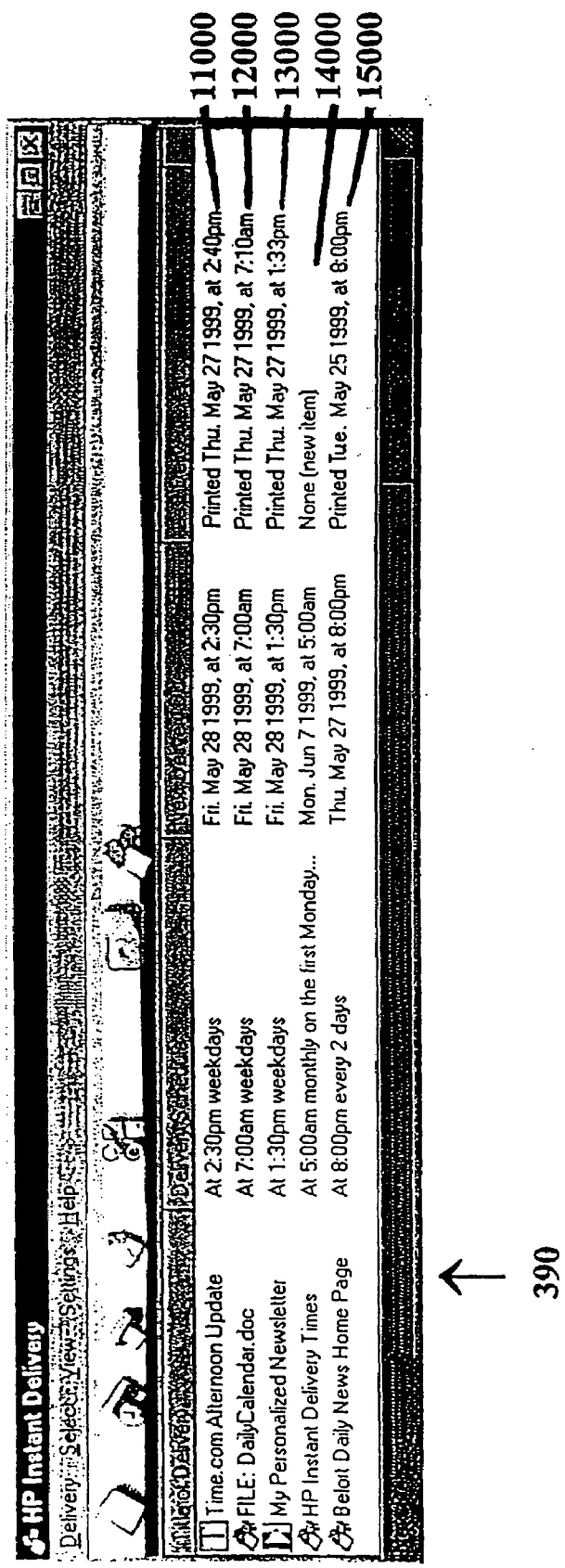
FIG. 7 shows a print schedule for the delivery of documents in one embodiment of the invention.

FIG. 7 shows one example of printing schedule 390, of the type that might be used in an enhanced version of HP's Instant Delivery program. In this example, the title of delivery, delivery schedule, next delivery data and time, and the last delivery status are shown. Preferably, the user can select what time a document should be printed, whether it should be printed on a specific day of the week or month, weekdays, or weekends, and whether the printing schedule should expire after a specific period of time or continue indefinitely.

Referring again to FIG. 2, printing module 380 monitors printing schedule 390 to see if a document should be requested from document server 100 or from another source. When block 2200 determines that a document should be requested from document server 100 or from another source, block 2200 is answered affirmatively, and block 2300 automatically requests the document without user intervention from server 100 or from another source, as will be described in greater detail below. Note that if printing module 380 is located on device 300, block 2200 operates in a "pull" mode—where the document is "pulled" from document server 100 or another source to device 300. However, if printing module 380 is located remotely from device 300, such as in document server 100, block 2200 operates in a "push" mode—where the document is "pushed" from document server 100 or another source to device 300. If block 2300 determines that the document is located on document server 100 or at another source accessible via network 200, and if device 300 is currently in a disconnected state where it is not operatively coupled to the network 200, block 2300 will sign on to or otherwise enter a connected state with network 200, so that device 300 is operatively coupled to network 200.

Meanwhile, block 1300 checks to see if a document has been requested from printing module 380 in block 2300. Once it determines that such a document has been requested, block 1400 generates the document for printing module 380. Block 1500 then sends the document to printing module 380. Block 2400 checks to see whether a document has been received from document server 100 via block 1500. Once such a document has been received, block 2500 automatically prints the document, without user intervention, on a printing device. The term "without user intervention" means that a user is not directly involved in the printing operation; the document is sent automatically to a device 300 to be printed out by a printing device. According to this mode of operation, the user does not press "any" print buttons or otherwise be directly involved in the printing process; in fact, the user may not even be present in the same room, city, state, or country as device 300 during the printing operation. The printing operation automatically occurs in an unattended state—regardless of whether the user is present or not. In addition, if print schedule 390 is stored in a device-independent manner, such as on document server 100, a travelling user could "log in" to document server 100 and have his or her customized document sent to a device 300 that is convenient to the user's current location.

Referring now to FIG. 3, block 2600 checks to see whether the document printed successfully. If not, block 2800 performs error handling, such as attempting to print the document again, notifying the user that the printing device is out of paper or has some other error condition, or simply deciding not to print the document. When the document prints successfully, block 2900 informs document server 100 that the document printed successfully. Block 1600 waits for an indication from printing module 380 that the document did print successfully. When such an indication is received, block 1700 updates the user profile with this information.

It will be appreciated that not all of the blocks in FIGS. 2–4 need be implemented, or implemented according to the order denoted, to fall within the spirit and scope of the present invention. More specifically, according to one implementation, flow of control moves from block 2600 to block 4100 of FIG. 4, as will be discussed later, and from block 1500 back to block 1300 of FIG. 2.

An alternate embodiment has been contemplated where other information is transmitted back to document server 100 in block 2900 to update the user profile preferably stored in knowledge module 170. This other information could be ink usage (total usage or usage broken out by ink color), printable media usage (number of pages printed, type of media used, etc.), or other types of information. In addition, another alternate embodiment has been contemplated where some or all of the information contained in the user profile stored in knowledge module 170 came from a source other than the user via printing module 380. For example, publicly or privately available information about the user, and/or the devices 300 he/she/they use, could be acquired from a wide variety of different sources and inserted into the user profile preferably stored in knowledge module 170.

Block 1800 examines the user profile preferably stored in knowledge module 170 to determine whether a product subsidy should be provide to the user. For example, if the information in the user profile indicates that this user has printed off his 1000th document, such as a "preferred" document that contains advertising from advertising providers 80 or is otherwise under the control of edit module 120, providing a product subsidy to the user may be warranted. For purposes of this invention, a "product subsidy" could be a print consumable or other product. A "print consumable" is an inkjet cartridge for an inkjet printer, ink for such an inkjet cartridge, a toner cartridge for a laser printer, toner for such a toner cartridge, or any other product or substance that is depleted when a document gets printed, including printer ribbons, etc. Note that the "ink" referred to above would typically be of a permanent variety, but erasable electronic ink, such as that sold by the Eink Company, could also be used.

Note that the product subsidy referred to herein is preferably funded at least in part by advertising revenue received from advertising providers 80 (FIG. 1), but an embodiment has been contemplated where the product subsidy is funded at least in part from the distribution revenue received from content providers 50 (FIG. 1). In either case, information (such as statistical information) about what was printed by whom is preferably provided to content providers 50 and/or advertising providers 80—preferably as a document that is automatically sent to one or more printing devices according to the teachings of this invention.

Other forms of products that are contemplated to be subsidized by this invention include printable media, such as plain paper, specialty paper, transparencies, and the like, and may also include devices 300 such as printing devices, electronic devices, and personal computers. In fact, alternate embodiments have been contemplated where other products, such as a subscription price to a document, or even a product not directly related to the document delivery system shown herein, such as soap or dog food, are subsidized. If block 1800 determines that such a subsidy is warranted, block 1900 requests that distribution module 400 provides such a subsidy to the user. In one embodiment, distribution module 400 simply mails a product such as a print consumable or other product such as the type described above to a user at the address specified in the user profile. In another embodiment, distribution module 400 mails or electronically generates a coupon that the user can use to receive a free or discounted product of the type described above. Regardless of whether block 1800 is answered affirmatively or negatively, flow of control then returns back to block 1300 (FIG. 2) to see if another document has been requested from the printing module 380.

Referring again to FIG. 3, after block 2900 informs document server 100 that the document printed successfully, flow of control moves to block 4100 (FIG. 4), which checks with document server 100 to see what the current version of printing module 380 is. Block 3100 checks to see whether such a request has been received, and when it is, block 3200 sends information concerning the current version of the printing module to printing module 380. Block 4200 compares this information from document server 100 with its own version and determines whether an updated version of printing module is available. For example, if printing module 380 is running version 4.0, and document server 100 indicates that version 4.1 is the current version of printing module 380, block 4200 would determine that an updated version of printing module 380 is available, and flow control would move to block 4300. Block 4300 checks to see whether this updated version of printing module 380 should be requested to be downloaded. While a user would typically be asked whether such a download should be requested or not, and would typically perform this download at a convenient time, such a step could also be performed automatically without user intervention. If such a download is requested, block 4400 is answered affirmatively, and block 3500 downloads the updated printing module, which is then installed in block 4500. Regardless of how blocks 4200 and 4300 are answered, flow of control moves to block 4600, which checks to see if a disconnected state should be entered. If block 2300 (FIG. 2) determined that device 300 was in a disconnected state when the document was requested, as discussed above (i.e., not operatively coupled to network 200), block 4600 is answered affirmatively, and block 4700 reenters the disconnected state. In any event, flow of control returns to block 2200 of FIG. 2.

Referring again to print schedule 390 shown in FIG. 7, it can be seen that many different types of documents can be requested to be printed. For example, the title of document 11000 specifies a network address, such as an Internet uniform resource locator (URL) that contains the network location of a document to be printed. Note that this URL may be partially or completely hidden from the user, as is the case with the URL for document 15000 (http://www.beloit-dailynews.com). In this scenario, edit module 120 of document server 100 merely goes out to the Internet at the URL indicated (which would be shown in FIG. 1 as one of the content providers 50), and captures the indicated document, which is then transmitted to a printing device via transmission module 150 and printing module 380, as has been discussed. Alternatively, device 300 could go directly out to the URL itself without assistance from document server 100; in this case, block 2300 (FIG. 2) requests document 11000 from another source—directly from the content provider 50 (at the indicated URL) via network 200.

In contrast, document 12000 is not a document that originates with a content provider 50 via the Internet, but instead is stored directly on device 300, such as a printing device, personal computer, or other electronic device. An example of such a document could be a daily calendar from a program such as Microsoft Outlook, which the user has requested be printed automatically to his printer, without any user intervention, at 7:00 a.m. every weekday morning. In such an embodiment, printing module 380 does not need to request the document from document server 100, since it can access the documents without going through network 200. In this embodiment, block 2300 of FIG. 2 requests the document from another source—device 300. While block 2900 would still preferably indicate that the document was printed, and while block 1700 would still preferably update the user profile in knowledge module 170, printing such a document would preferably not generate any type of credit towards a product subsidy, since such a document would not be considered a "preferred" document, e.g., not a document under the control of edit module 120.

Figure 14:
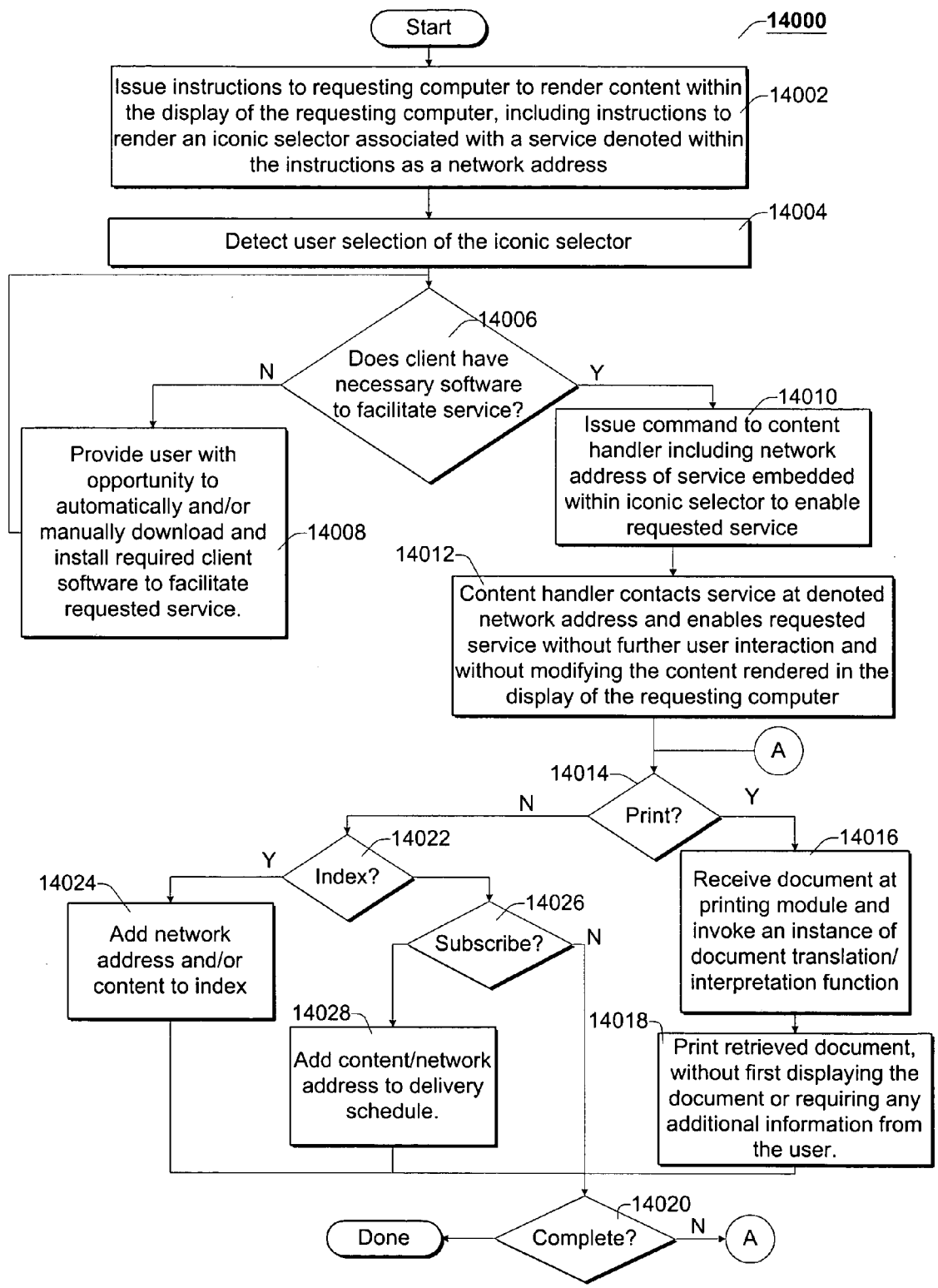
FIG. 14 illustrates a block diagram of an example method of content handler operation, according to one embodiment of the present invention.
Figure 15:
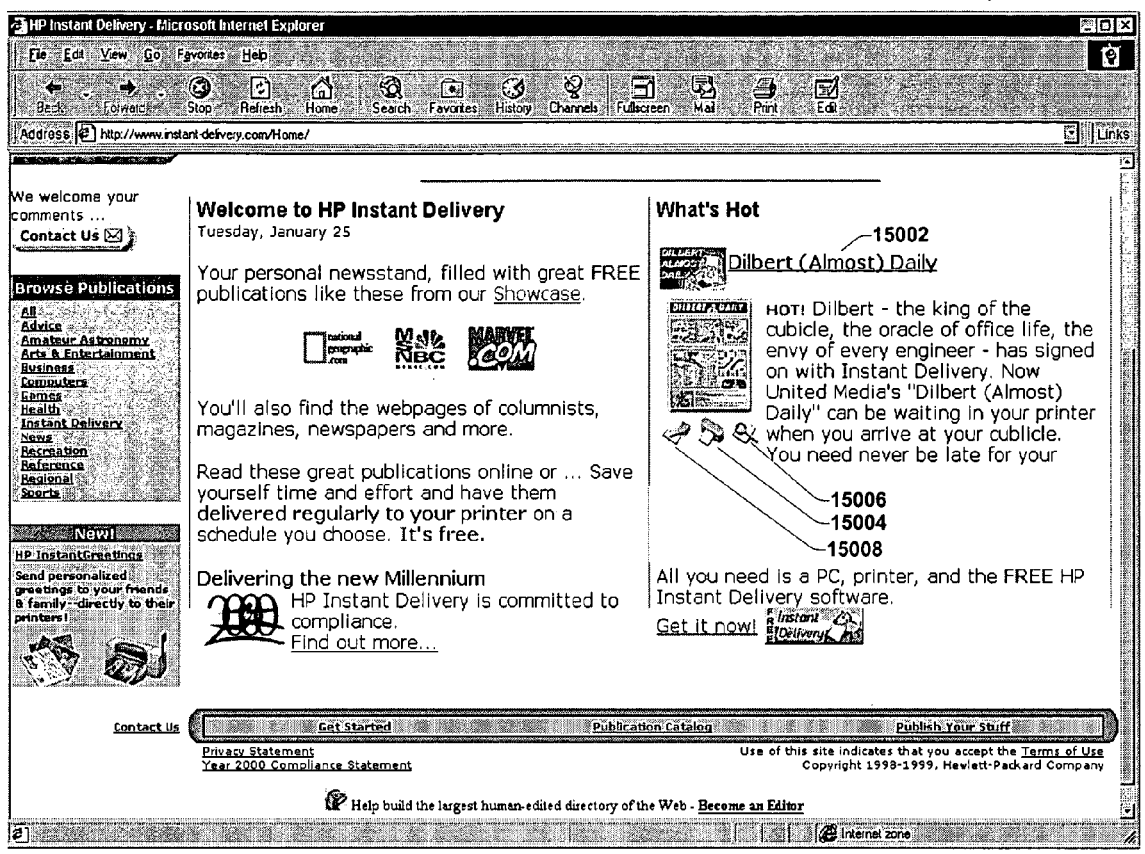
FIG. 15 graphically illustrates an example web page including an iconic selector which, when selected by a user, automatically invokes the teachings of the present invention, according to one implementation of the present invention.

Turning next to FIGS. 14 and 15, an example operation and implementation of an example content handling system is presented, according to one embodiment of the present invention. More specifically, with reference to FIG. 14, a flow chart describing an automated content handling system implemented by document delivery system 10 is presented, according to one embodiment of the present invention. For ease of explanation and illustration, the method will be developed with further reference to an example user interface (e.g., a web page) depicted in FIG. 15.

Turning first to FIG. 15, an example user interface incorporating one aspect of the present invention is presented in the form of web page content. It is to be appreciated that alternate user interface(s) may well be used such as, for example, electronic mail (email) messages (see, e.g., FIG. 16), word processing documents, and the like may well be used without deviating from the spirit and scope of the present invention. According to the illustrated example embodiment, the user interface is a web page for the HP Instant Delivery Service 15000. As depicted, the web page 15000 includes a "What's Hot" section with a featured document or publication, 15002. In addition to a hypertext link to the document 15002, the selection of which would result in redirecting the browser to display the document, web page 15000 includes an iconic selector 15004, which when selected invokes the automated print function 404 of content handler 401 without redirecting the browser, displaying the document, etc.

According to one implementation, iconic selector 15004 (e.g., a button) is generated by a provider of the user interface with one or more executable instructions that include an action designator and a name/identifier and location of the linked document embedded within the instructions. According to the illustrated example embodiment, the iconic selector is generated from one or more hypertext markup language (HTML) instructions. According to the teachings of the present invention, the HTML instructions include a call to a delivery server 100 of document delivery system 10, which includes an action designator and a network address for the denoted content. An example call syntax is:

href=http://Deliveryserver.com/content_type/useraction/
?ActionDesignator¶meters&HpiDetect=1&
HpURL=http://Content.networkaddress.com (1)

In the syntax above, the deliveryserver.com is the network address for document delivery server 100, which receives the command issued upon user selection of the iconic selector, regardless of whether the iconic selector is embedded in content presented by the server 100, or by a third-party content provider. The content_type denotes whether the content is a publication, multimedia content, a service, and the like. As introduced above, the ActionDesignator denotes whether the content is to be "printed", "subscribed", "indexed", "downloaded" and the like. The associated parameters are included to denote information such as printing time, index category, and the like. If HpiDetect is set to one (1), document delivery server 100 confirms that the requesting device 300 is populated with content handler 401 before issuing the command to print/subscribe/index the denoted content. According to one implementation, if the requesting device 300 does not include the content handler 401, document delivery server 100 provides device 300 with an opportunity to download and install content handler 401. Finally, as introduced above, the content.networkaddress.com denotes the name and/or network address of the available content. Example instructions implementing the foregoing syntax include:

Subscription:
http://services.instant-delivery.com/publication/useraction/
?hpaction=subscribe&HpCycle=W1%20MO&H
pTime=1200&HpiDetect=1&HpUrl=http://www.a-nadtech.com (2)

Print:
http://services.instant-delivery.com/publication/useraction/
?hpaction=print&HpiDetect=1&HpUrl=http://www.a-nadtech.com (3)

Index:
http://services.instant-delivery.com/publication/useraction/
?hpaction=index&HpCategory=Tech&HpiDetect=
0&HpUrl=http://www.anadtech.com (4)

Download:
http://services.instant-delivery.com/music/useraction/
?hpaction=download&HpiDetect=1&HpUrl=http://www.kittyvermont.com/wonderfulyou.wav (5)

FIG. 14 illustrates a flow chart detailing the operation of the automated content handling system, in accordance with one example embodiment of the present invention. As shown, the method begins with block 14002 with a user viewing a user interface (e.g., web page 15000) document with links to other available content. In accordance with the teachings of the present invention, the links are iconic selector(s) (15004, 15006, 15008) which, when selected by a user, automatically subscribe, print and/or index available content without modifying the content rendered for the user (e.g., the web page 15000) or requiring further input from the user, except in the instance where the content handler 401 is to be downloaded/installed. In block 14004, document delivery server 100 detects user selection of one or more iconic selector(s) 15004–15008. More specifically, as introduced above, upon selecting an iconic selector (e.g., pressing the virtual "button"), a call (e.g., call 2–5, above) is sent to document delivery server 100 to initiate the requested process.

Upon receiving the call, document delivery server 100 determines whether the requesting device 300 is populated with the content handler 401, block 14006. As introduced above, document delivery server 100 analyzes the received call to determine whether HpiDetect is zero (0) or one (1). If, in block 14006 document delivery server 100 receives a call wherein HpiDetect is zero (0), and content handler 401 is required to fulfill the request, document delivery server 100 prompts the user at device 300 whether they wish to download and install content handler 401 to complete their request. If so, document delivery server 100 provides the user with the opportunity to download and install content handler 401, block 14008. According to one implementation, the download and installation of content handler 401 is automated using a self-extracting and installation executable, or a program to program communication.

If, in block 14006, document delivery server 100 determines that the content handler 401 resides on device 300, document delivery server 100 issues a command(s) to content handler 401 on device 300 including at least the action designator and the network address of the available content, block 14010. As introduced above, controller 402 of content handler 401 receives the command(s) via I/O interface 412 and selectively invokes an appropriate one or more of functions 404 and 406. In block 14012, content handler 401 contacts the provider of the denoted content at the received network address and enables the requested service (i.e., print, download, subscribe and/or index) without modifying the content rendered on device 300 and without requiring further user input.

Accordingly, if the received command included the print action designator, the process continues with block 14016 wherein content handler 401 receives the content in memory 410, and selectively invokes an instance of the document translation/interpretation function 408. In block 14018, automated print function 404 of content handler 401 prints the received document without first displaying the content or requiring any additional information from the user. In block 14020, content handler determines whether any additional action designators (i.e., index or subscribe) were received with respect to the retrieved document. If so, the process continues with blocks 14022 and/or 14026, described below.

If the action designator of the command received from document delivery server 100 was the "index" command, the network address and/or the content denoted by network address is added to the index, block 14024. As introduced above, the index may well be maintained locally, e.g., within content handler 401, or remotely, e.g., at document delivery server 100. Alternatively, the index may well be maintained within document delivery system 10, e.g., at knowledge module 170. As before, the process continues with block 14020, wherein content handler determines whether any additional (i.e., subscribe) action designators were received with respect to the retrieved document. If so, the process continues with block 14026.

If the action designator of the command received from server 100 includes the "subscribe" command, content handler 401 adds the network address and/or denoted content to a print schedule to automatically subscribe the user to receive the content on a periodic (e.g., weekly, monthly, quarterly, or as available, etc.) basis, block 14028. In accordance with the teachings of the present invention, upon receiving a "subscribe" action designator, controller 402 invokes an instance of index/subscribe function 406 to add the denoted content to the print schedule. As described above, the print schedule may well be maintained locally, e.g., within content handler 401 or, alternatively within the document delivery network, e.g., at document delivery server 100, print module 380 or devices 300.

In an alternate embodiment of the subscribe function, content handler 401 is used to subscribe users with independent content providers using the user profile maintained within document delivery system 10. In accordance with this alternate embodiment, index/subscribe function 406 accesses the user profile information from an appropriate data store, and provides the content provider with the information required to subscribe the user to the content from the independent content provider, thereby relieving the user from doing so. While this may seem like an extraneous function for the document delivery system 10, it is a value added service for users of the document delivery system 10 helping to build brand equity and user loyalty. In this regard, the alternate embodiment has business value.

Figure 16:
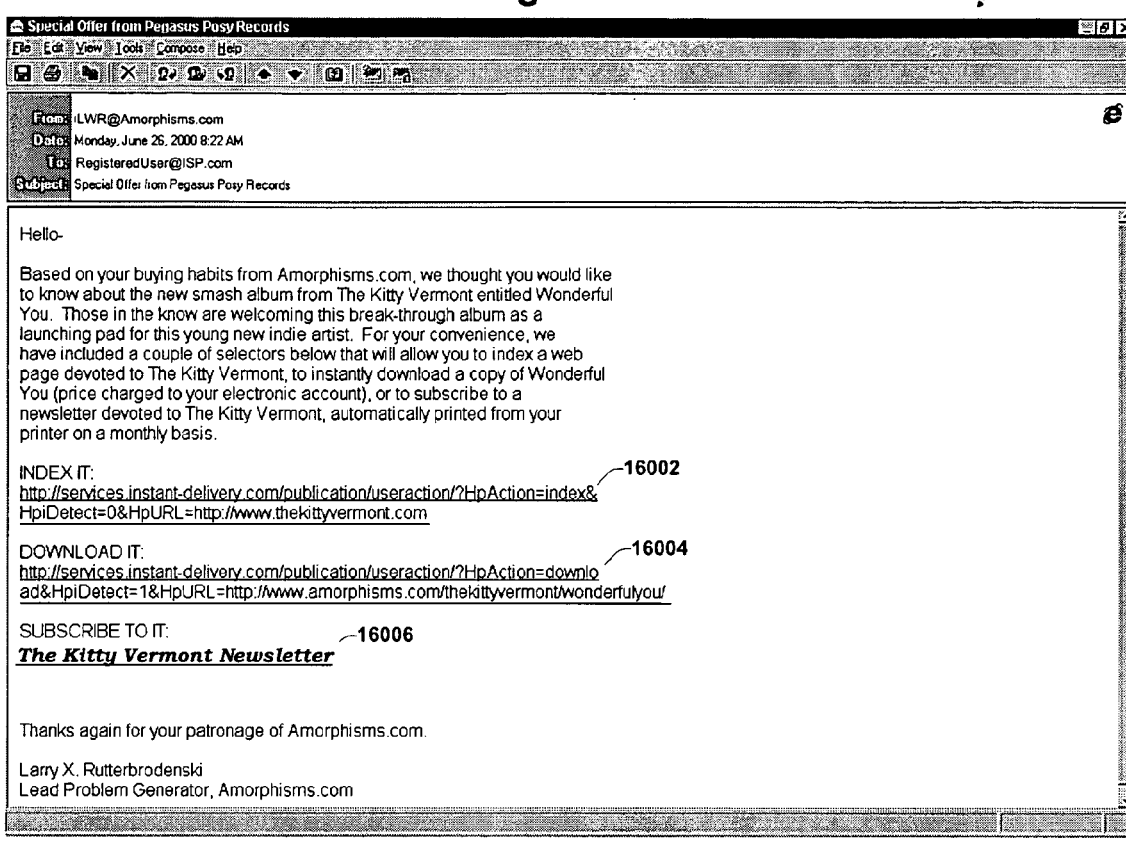
FIG. 16 illustrates an example email including an alternative iconic selector(s) associated with available content which, when selected by the user, invokes the teachings of the present invention, according to another implementation of the present invention.

FIG. 16 graphically illustrates an alternate user interface incorporating the teachings of the present invention. More particularly, FIG. 16 shows an example of how the teachings of the present invention may be translated for use in an email application, wherein an email is the user interface (in place of a web page, for example). In accordance with the illustrated example embodiment of FIG. 16, an email 16000 is depicted including an address/header area and a body. Within the body is a textual message and one or more iconic selector(s) 16002–16006. In particular two alternate "types" of iconic selector is illustrated including (1) hypertext links, or calls, such as the ones denoted above (calls 2–5) (16002, 16004), and a textual iconic selector 16006. More particularly, a hypertext iconic selector is presented to implement the automated index function 16002 and the automated download function 16004, while iconic selector 16006 associated with the automated subscribe function "hides" the associated call from the purview of the user. User selection of one or more of these iconic selectors 16002–16006 selectively invokes an appropriate one or more functions 404–408 of content handler 401, as discussed above. Although not depicted, it will be appreciated that an email system supporting HTML instructions may well utilize the graphical iconic selectors as in FIG. 15. It should be appreciated, based on the foregoing, that additional functions may well be added to content handling system without deviating from the spirit and scope of the present invention.

Referring again to FIG. 7, a print schedule of document 13000 is shown. Document 13000 is referred to as a "personalized document". A "personalized document" is a document that is assembled by edit module 120 of document server 100 from a variety of content providers 50 and advertising providers 80, based on information contained in the user profile stored in knowledge module 170. For example, document 13000 is a "personalized document". Our user has requested that document 13000—his personalized newspaper—be printed at 6:00 a.m. every day. Edit module 120 examines the user's interests as specified in the user profile stored in knowledge module 170 to assemble the document from selected content providers 50 in which the user has indicated an interest. Edit module 120 also inserts advertising from selected advertising providers 80—again based on the user profile stored in knowledge module 170.

Figure 8:
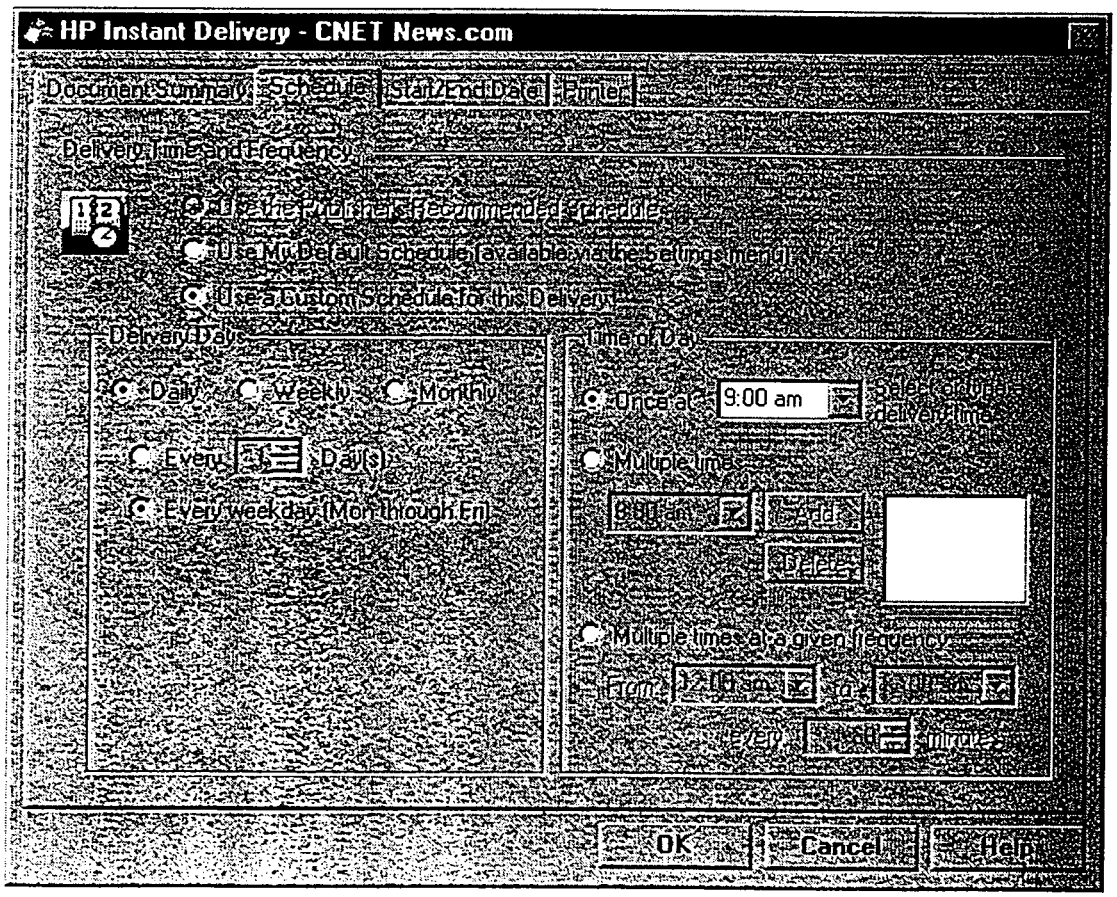
FIG. 8 shows how the print schedule of FIG. 7 can be modified by the user.

FIG. 8 shows how the print schedule 390 of FIG. 7 can be edited by the user. The user can use the publisher's recommended schedule, use a default schedule the user has set, or use a custom schedule for delivery. If a custom schedule is selected, the user can select a daily, weekly, or monthly delivery, or select a delivery once every specified number of days, or specify every weekday. In addition, the time of day can also be specified: once at a designated time, multiple times during the day, or multiple times separated by a specified period of time. While not shown here, the user could also edit print schedule 390 to request that a document be sent upon creation, or upon the occurrence of an external event.

FIGS. 9A–9B show document 11000 printed by the printing device according to one embodiment of the invention. Note that this document came from one content provider 50 via network 200 (either through document server 100 or directly), and contains no advertising. While document 11000 is preferably formatted by content provider 50 such that the information contained in the document is optimized to be printed, such formatting is not necessary.

Figure 10:
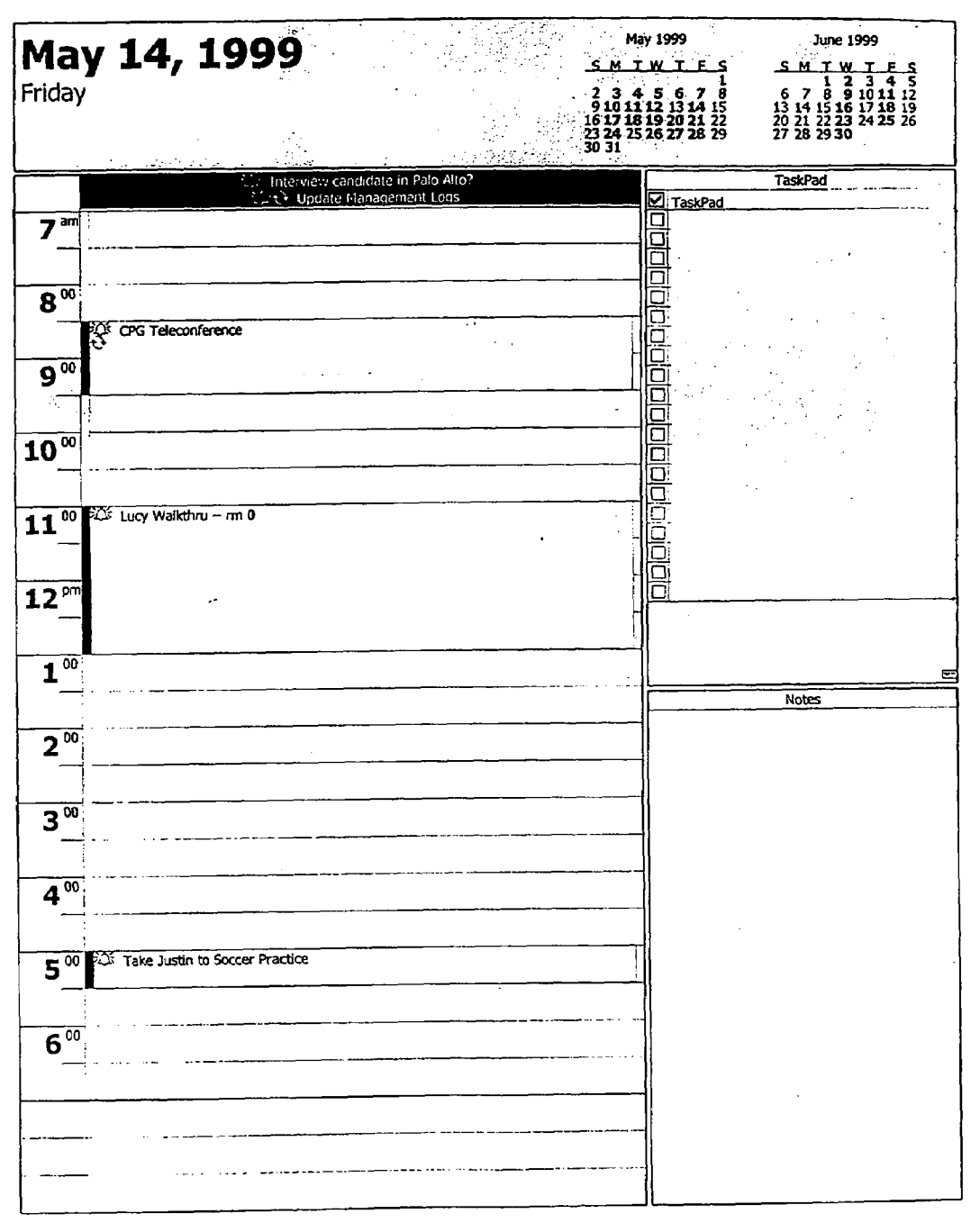

FIG. 10 shows document 12000 printed by the printing device according to one embodiment of the invention. Note that this document is a user's daily calendar which came directly from device 300 and not from document server 100 via network 200.

FIGS. 11A–D show document 1300 printed by the printing device according to one embodiment of the invention. Note that this document is a user's personalized newspaper which contains information in which the user has indicated a specific interest in, as stored in the user profile in knowledge module 170. Note also that this document contains advertising that edit module 120 determined the user would also be interested in, again based on the information contained in the user profile stored in knowledge module 170. As has already been discussed, when the user prints a sufficient number of such "preferred" documents, the user may receive a product subsidy of a print consumable or other product(s).

FIG. 12 shows document 14000 printed by the printing device according to one embodiment of the present invention. Note that document 14000 is the HP Instant Delivery Times—a document located on document server 100. While this document does not contain advertising per se, it is still considered to be a "preferred document", since it is under the control of edit module 120. Document 14000 informs users of Instant Delivery of new releases or new information about the Instant Delivery Program.

What is claimed is:

1. A content handler comprising:

an automated print function, to access and print content from a content provider denoted by a network address in a received request;

an index/subscribe function, to add the content and/or network address of the content to an index of content and/or schedule periodic delivery of the content from the content provider denoted by the network address; and a controller, communicatively coupled to the print function and the subscribe/index function, to receive the request and selectively invoke one or more of the print function and/or the index/subscribe function based, at least in part, on content of an action designator within the received request, wherein the index/subscribe function is remotely located from the controller and/or the automated print function.

2. A content handler according to claim 1, further comprising:

an index of content, wherein the index/subscribe function automatically adds the content and/or network address of the content to the index upon receipt of a request including an index action designator.

3. A content handler according to claim 1, wherein the index is maintained in a remote server communicatively coupled to the content handler.

4. A content handler according to claim 1, wherein the print function is selectively invoked by controller in response to a received request including a print action designator.

5. A content handler according to claim 1, wherein the index/subscribe function is selectively invoked to subscribe a user for content delivery in response to a received request including a subscribe action designator.

6. A content handler according to claim 5, wherein the content and/or network address denoted in the received request is added to a delivery schedule.

7. A content handler according to claim 6, wherein the delivery schedule is maintained within the content handler.

8. A content handler according to claim 6, wherein the delivery schedule is maintained at a remote server.

9. A content handler according to claim 1, wherein the received request is generated by a remote server in response to user selection of one or more iconic selector(s) embedded within content received by the user via one or more of a web page, an email, and the like.

10. A content handler according to claim 9, wherein the iconic selector includes the network address associated with the content and an action designator.

* * * * *